United States Patent
Shimoda

(10) Patent No.: US 12,466,259 B2
(45) Date of Patent: Nov. 11, 2025

(54) HEAD UP DISPLAY APPARATUS

(71) Applicant: Maxell, Ltd., Kyoto (JP)

(72) Inventor: Nozomu Shimoda, Kyoto (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 18/719,299

(22) PCT Filed: Nov. 14, 2022

(86) PCT No.: PCT/JP2022/042233
§ 371 (c)(1),
(2) Date: Jun. 13, 2024

(87) PCT Pub. No.: WO2023/119943
PCT Pub. Date: Jun. 29, 2023

(65) Prior Publication Data
US 2025/0128601 A1    Apr. 24, 2025

(30) Foreign Application Priority Data

Dec. 20, 2021    (JP) ................... 2021-205707

(51) Int. Cl.
*B60K 35/00*    (2024.01)
*B60K 35/22*    (2024.01)
(Continued)

(52) U.S. Cl.
CPC .......... *B60K 35/23* (2024.01); *B60K 35/22* (2024.01); *B60K 35/232* (2024.01); *B60K 35/28* (2024.01);
(Continued)

(58) Field of Classification Search
CPC ................................... B60K 35/00
See application file for complete search history.

(56) References Cited

U.S. PATENT DOCUMENTS

| 10,479,319 B1 * | 11/2019 | Wengreen | .............. B60K 35/65 |
| 2012/0169760 A1 * | 7/2012 | Mochizuki | .............. G06F 21/31 |
| | | | 345/156 |

(Continued)

FOREIGN PATENT DOCUMENTS

| JP | 2010-078623 A | 4/2010 |
| JP | 2013-237320 A | 11/2013 |

(Continued)

OTHER PUBLICATIONS

International Search Report of PCT/JP2022/042233 dated Jan. 17, 2023.

*Primary Examiner* — Nan-Ying Yang
(74) *Attorney, Agent, or Firm* — Mattingly & Malur, PC

(57) ABSTRACT

A head up display apparatus capable of suppressing discomfort to a user caused by an operating noise while preventing damage by sunlight is provided. Further, it contributes to "Goal 3: Ensure healthy lives and promote well-being for all at all ages" in the Sustainable Development Goals (SDGs). Thus, a video light projector 6 includes a drive mechanism 14 and projects video light emitted from a video display 11 to a display region 8, thereby making the projected video light visually recognized as a virtual image. A controller judges whether or not a door unlock signal which is one of information related to a transportation is received, and judges whether or not to cause the video display 11 to start displaying the video by operating the drive mechanism 14 in the video light projector 6 based on a display start condition when the door unlock signal is received.

13 Claims, 15 Drawing Sheets

(51) Int. Cl.
  *B60K 35/23* (2024.01)
  *B60K 35/232* (2024.01)
  *B60K 35/28* (2024.01)
  *B60K 35/50* (2024.01)
  *B60K 35/81* (2024.01)
  *B60K 35/90* (2024.01)
  *G08G 1/16* (2006.01)
  *B60K 35/10* (2024.01)
  *B60K 35/60* (2024.01)
  *B60K 35/70* (2024.01)

(52) U.S. Cl.
  CPC .............. *B60K 35/50* (2024.01); *B60K 35/81* (2024.01); *B60K 35/90* (2024.01); *B60K 35/10* (2024.01); *B60K 35/60* (2024.01); *B60K 35/70* (2024.01); *B60K 2360/177* (2024.01); *B60K 2360/1876* (2024.01); *B60K 2360/195* (2024.01); *B60K 2360/23* (2024.01); *B60K 2360/31* (2024.01); *B60K 2360/741* (2024.01)

(56) References Cited

U.S. PATENT DOCUMENTS

| | | | | |
|---|---|---|---|---|
| 2015/0015963 | A1* | 1/2015 | Takasu | G02B 27/01 359/630 |
| 2016/0288705 | A1* | 10/2016 | Henon | B60K 35/22 |
| 2017/0154554 | A1* | 6/2017 | Tanaka | G08G 1/166 |
| 2018/0017793 | A1* | 1/2018 | Sasaki | B60K 35/60 |
| 2020/0294431 | A1* | 9/2020 | Nakajima | B32B 17/10018 |
| 2021/0104212 | A1* | 4/2021 | Horihata | B60R 16/02 |
| 2021/0188159 | A1* | 6/2021 | Fukutaka | B60Q 1/46 |
| 2022/0107201 | A1 | 4/2022 | Yagyu et al. | |
| 2024/0071231 | A1* | 2/2024 | Nohara | B60Q 3/217 |

FOREIGN PATENT DOCUMENTS

| | | |
|---|---|---|
| JP | 2016-046650 A | 4/2016 |
| JP | 2017-206180 A | 11/2017 |
| JP | 2018-097252 A | 6/2018 |
| JP | 2021-006805 A | 1/2021 |

\* cited by examiner

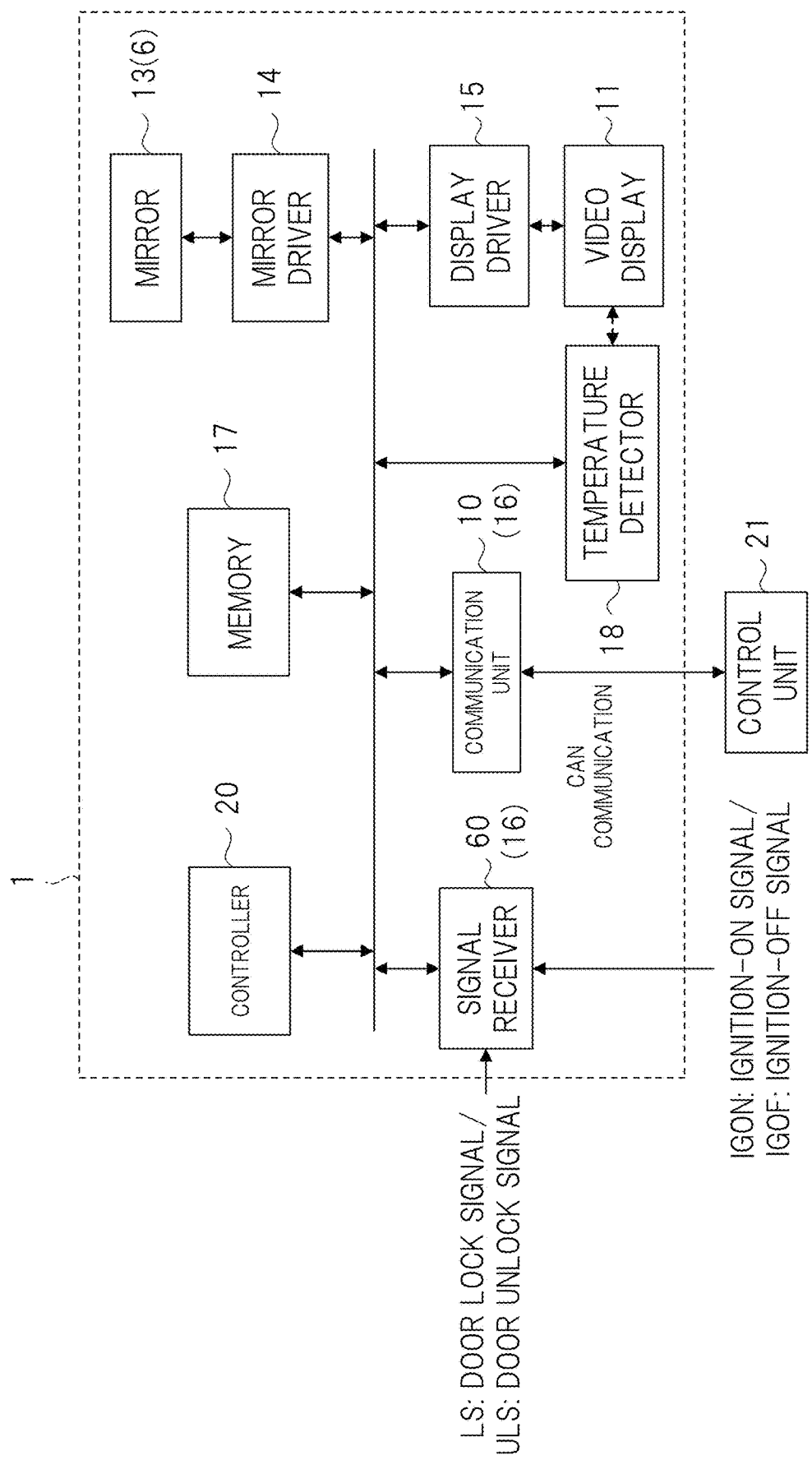

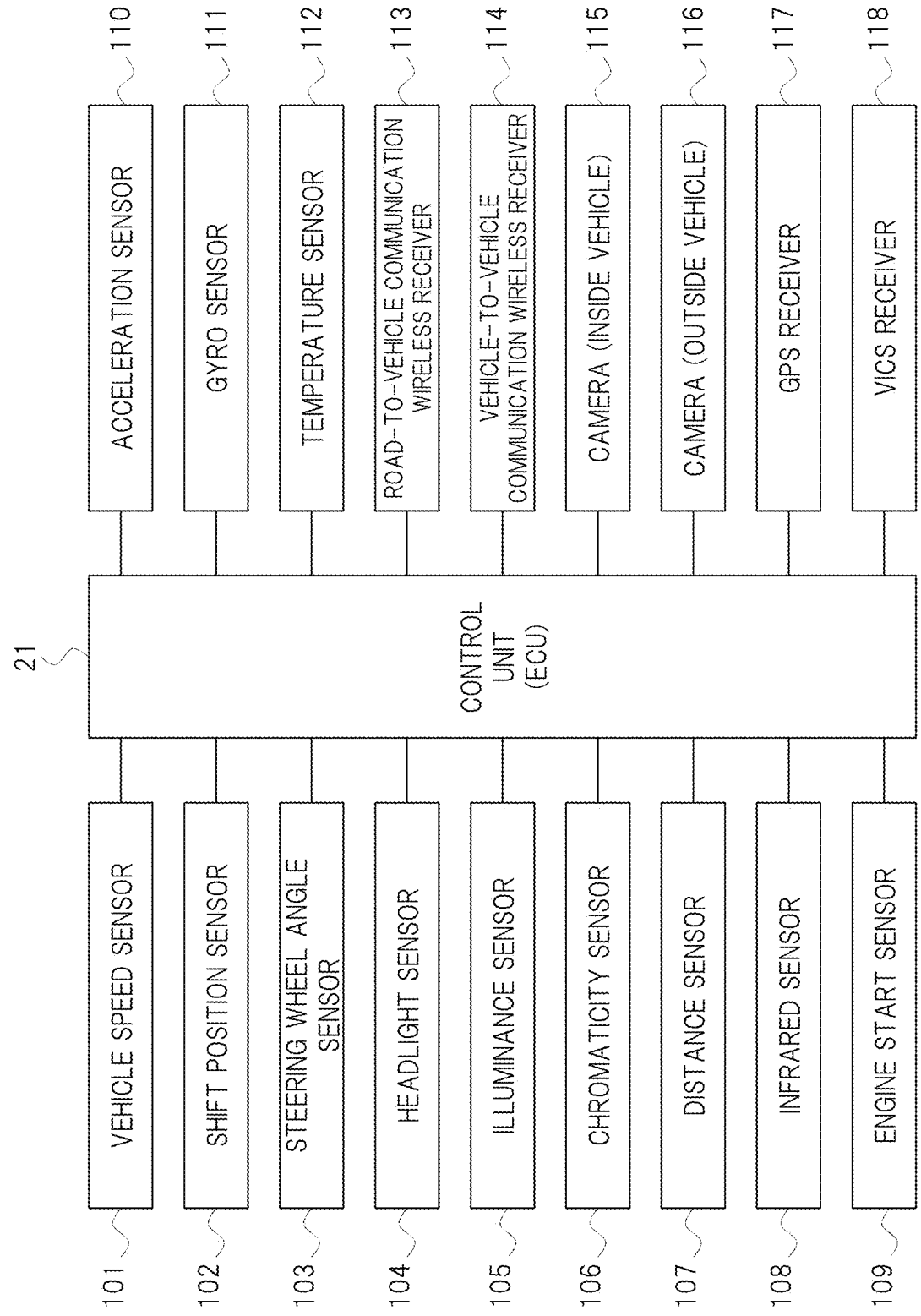

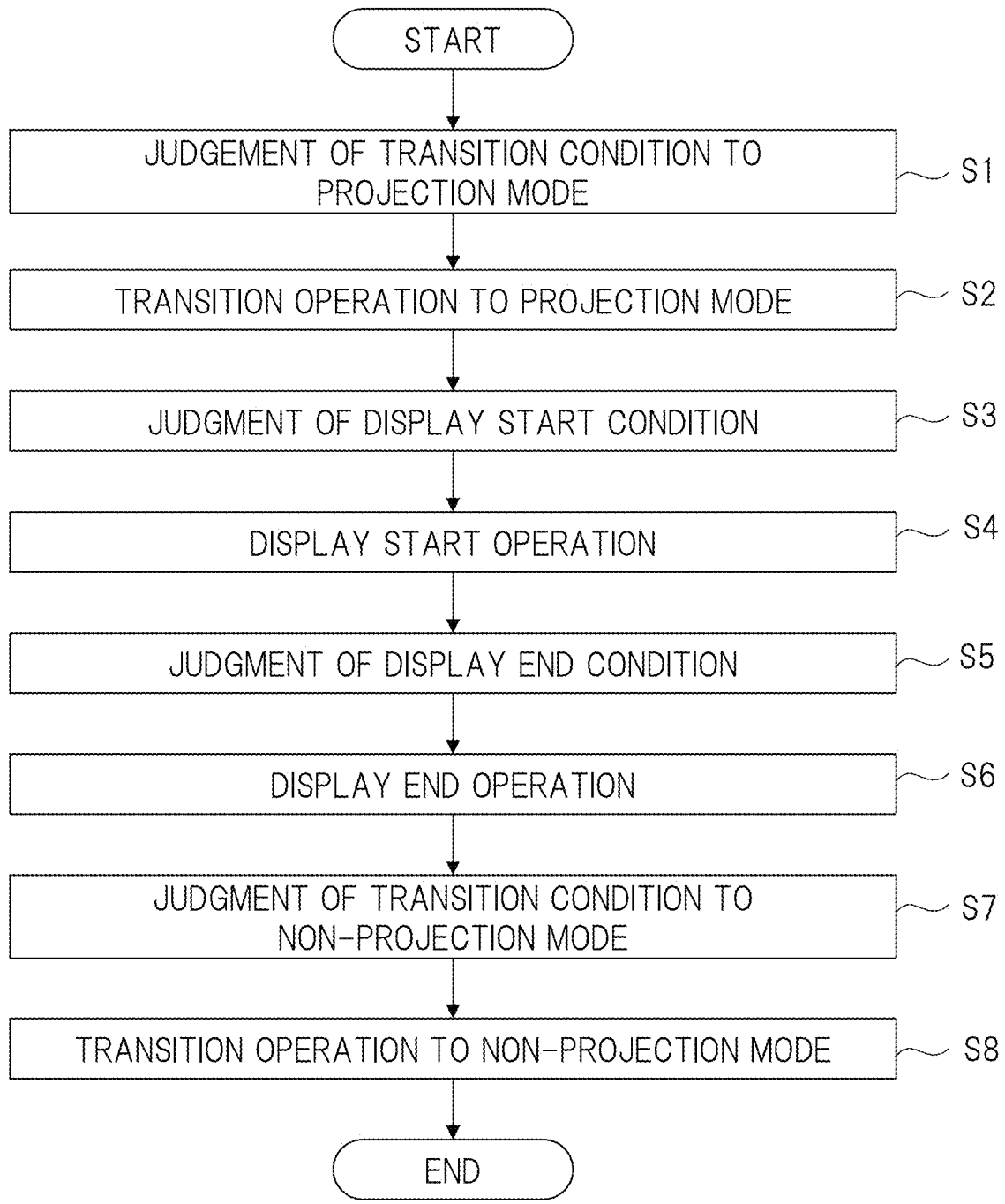

FIG. 6

| | SPECIFIC EXAMPLE OF JUDGEMENT OF TRANSITION CONDITION TO PROJECTION MODE (STEP S1) |
|---|---|
| EXAMPLE 1-1 | CONDITION IS SATISFIED WHEN FOLLOWING CONDITION (1A) IS SATISFIED.<br>(1A) DOOR UNLOCK SIGNAL BY KEY INSERTION IS RECEIVED. |
| EXAMPLE 1-2 | CONDITION IS SATISFIED WHEN FOLLOWING CONDITION (1B) IS SATISFIED.<br>(1B) DOOR UNLOCK SIGNAL BY SMART KEY IS RECEIVED. |
| EXAMPLE 1-3 | CONDITION IS SATISFIED WHEN FOLLOWING CONDITION (1C) IS SATISFIED.<br>(1C) DOOR UNLOCK SIGNAL BY KEYLESS KEY IS RECEIVED. |
| EXAMPLE 1-4 | CONDITION IS SATISFIED WHEN FOLLOWING CONDITION (1D) IS SATISFIED.<br>(1D) DOOR UNLOCK SIGNAL BY MOBILE TERMINAL IS RECEIVED. |
| EXAMPLE 1-5 | CONDITION IS SATISFIED WHEN FOLLOWING CONDITIONS (1E) AND (1F) ARE SATISFIED.<br>(1E) "HUD USE" IS SET.<br>(1F) DOOR UNLOCK SIGNAL IS RECEIVED. |
| EXAMPLE 1-6 | CONDITION IS NOT SATISFIED WHEN FOLLOWING CONDITION (1G) IS SATISFIED.<br>(1G) "HUD NON-USE" IS SET. |

FIG. 7

| | SPECIFIC EXAMPLE OF TRANSITION OPERATION TO PROJECTION MODE (STEP S2) |
|---|---|
| EXAMPLE 2-1 | (S21) DRIVE MECHANISM IS OPERATED.<br>(S22a) MANAGEMENT OF DISPLAY STANDBY TIME IS STARTED BY TIMER (FIXED TIMEOUT VALUE) IN CONTROL UNIT A.<br>(S23) TEMPERATURE DETECTION OF DISPLAY PANEL IS STARTED BY TEMPERATURE DETECTOR.<br>(S24a) TRANSITION COMPLETION NOTIFICATION IS NOT ISSUED WHEN TRANSITION OPERATION IS COMPLETED. |
| EXAMPLE 2-2 | (S21) DRIVE MECHANISM IS OPERATED.<br>(S22a) MANAGEMENT OF DISPLAY STANDBY TIME IS STARTED BY TIMER (FIXED TIMEOUT VALUE) IN CONTROL UNIT A.<br>(S23) TEMPERATURE DETECTION OF DISPLAY PANEL IS STARTED BY TEMPERATURE DETECTOR.<br>(S24b) TRANSITION COMPLETION NOTIFICATION IS ISSUED WHEN TRANSITION OPERATION IS COMPLETED. |
| EXAMPLE 2-3 | (S21) DRIVE MECHANISM IS OPERATED.<br>(S22b) MANAGEMENT OF DISPLAY STANDBY TIME IS STARTED BY TIMER (VARIABLE TIMEOUT VALUE) IN CONTROL UNIT A.<br>(S23) TEMPERATURE DETECTION OF DISPLAY PANEL IS STARTED BY TEMPERATURE DETECTOR.<br>(S24a) TRANSITION COMPLETION NOTIFICATION IS NOT ISSUED WHEN TRANSITION OPERATION IS COMPLETED. |
| EXAMPLE 2-4 | (S21) DRIVE MECHANISM IS OPERATED.<br>(S22b) MANAGEMENT OF DISPLAY STANDBY TIME IS STARTED BY TIMER (VARIABLE TIMEOUT VALUE) IN CONTROL UNIT A.<br>(S23) TEMPERATURE DETECTION OF DISPLAY PANEL IS STARTED BY TEMPERATURE DETECTOR.<br>(S24b) TRANSITION COMPLETION NOTIFICATION IS ISSUED WHEN TRANSITION OPERATION IS COMPLETED. |
| EXAMPLE 2-5 | COMBINATION OF (S21), (S23), AND (S24a) IN EXAMPLE 2-1 AND FOLLOWING (S22c)<br>(S22c) MANAGEMENT OF DISPLAY STANDBY TIME IS STARTED BY TIMER (FIXED TIMEOUT VALUE) IN HUD. |
| EXAMPLE 2-6 | COMBINATION OF (S21), (S23), AND (S24b) IN EXAMPLE 2-2 AND FOLLOWING (S22c)<br>(S22c) MANAGEMENT OF DISPLAY STANDBY TIME IS STARTED BY TIMER (FIXED TIMEOUT VALUE) IN HUD. |
| EXAMPLE 2-7 | COMBINATION OF (S21), (S23), AND (S24a) IN EXAMPLE 2-3 AND FOLLOWING (S22d)<br>(S22d) MANAGEMENT OF DISPLAY STANDBY TIME IS STARTED BY TIMER (VARIABLE TIMEOUT VALUE) IN HUD. |
| EXAMPLE 2-8 | COMBINATION OF (S21), (S23), AND (S24b) IN EXAMPLE 2-4 AND FOLLOWING (S22d)<br>(S22d) MANAGEMENT OF DISPLAY STANDBY TIME IS STARTED BY TIMER (VARIABLE TIMEOUT VALUE) IN HUD. |

FIG. 8

| | SPECIFIC EXAMPLE OF JUDGEMENT OF DISPLAY START CONDITION (STEP S3) |
|---|---|
| EXAMPLE 3-1 | CONDITION IS SATISFIED WHEN FOLLOWING CONDITIONS (3A) AND (3B) ARE SATISFIED.<br>(3A) TRANSITION OPERATION TO PROJECTION MODE IS COMPLETED.<br>(3B) IGNITION-ON SIGNAL IS RECEIVED. |
| EXAMPLE 3-2 | CONDITION IS SATISFIED WHEN FOLLOWING CONDITIONS (3A), (3B), AND (3C) ARE SATISFIED.<br>(3A) TRANSITION OPERATION TO PROJECTION MODE IS COMPLETED.<br>(3B) IGNITION-ON SIGNAL IS RECEIVED.<br>(3C) TRANSITION CONDITION TO NON-PROJECTION MODE IS NOT SATISFIED. |
| EXAMPLE 3-3 | CONDITION IS SATISFIED WHEN FOLLOWING CONDITIONS (3A) AND (3B) AND/OR (3D) ARE SATISFIED.<br>(3A) TRANSITION OPERATION TO PROJECTION MODE IS COMPLETED.<br>(3B) IGNITION-ON SIGNAL IS RECEIVED.<br>(3D) DRIVER IS PREPARING FOR DRIVING. |
| EXAMPLE 3-4 | CONDITION IS SATISFIED WHEN FOLLOWING CONDITIONS (3A), (3C), AND (3B) AND/OR (3D) ARE SATISFIED.<br>(3A) TRANSITION OPERATION TO PROJECTION MODE IS COMPLETED.<br>(3B) IGNITION-ON SIGNAL IS RECEIVED.<br>(3C) TRANSITION CONDITION TO NON-PROJECTION MODE IS NOT SATISFIED.<br>(3D) DRIVER IS PREPARING FOR DRIVING. |
| EXAMPLE 3-5 | CONDITION IS SATISFIED WHEN FOLLOWING CONDITIONS (3A), (3B), AND (3E) ARE SATISFIED.<br>(3A) TRANSITION OPERATION TO PROJECTION MODE IS COMPLETED.<br>(3B) IGNITION-ON SIGNAL IS RECEIVED.<br>(3E) SIDE MIRROR OPEN SIGNAL IS RECEIVED. |

FIG. 9

|  | SPECIFIC EXAMPLE OF DISPLAY START OPERATION (STEP S4) |
|---|---|
| EXAMPLE 4-1 | (S41) VIDEO DISPLAY IS CAUSED TO START DISPLAYING VIDEO.<br>(S42) MANAGEMENT OF DISPLAY STANDBY TIME IS ENDED. |
| EXAMPLE 4-2 | (S41) VIDEO DISPLAY IS CAUSED TO START DISPLAYING VIDEO.<br>(S42) MANAGEMENT OF DISPLAY STANDBY TIME IS ENDED.<br>(S43a) MANAGEMENT OF HUD DISPLAY CONTINUATION TIME IS STARTED BY TIMER IN CONTROL UNIT A. |
| EXAMPLE 4-3 | (S41) VIDEO DISPLAY IS CAUSED TO START DISPLAYING VIDEO.<br>(S42) MANAGEMENT OF DISPLAY STANDBY TIME IS ENDED.<br>(S43b) MANAGEMENT OF HUD DISPLAY CONTINUATION TIME IS STARTED BY TIMER IN HUD. |
| EXAMPLE 4-4 | (S41) VIDEO DISPLAY IS CAUSED TO START DISPLAYING VIDEO.<br>(S42) MANAGEMENT OF DISPLAY STANDBY TIME IS ENDED.<br>(S43c) MANAGEMENT OF HUD DISPLAY CONTINUATION TIME IS STARTED BY TIMER IN CONTROL UNIT B. |

FIG. 10

|  | SPECIFIC EXAMPLE OF JUDGMENT OF DISPLAY END CONDITION (STEP S5) |
|---|---|
| EXAMPLE 5-1 | CONDITION IS SATISFIED WHEN FOLLOWING CONDITIONS (5A) AND (5B) ARE SATISFIED.<br>(5A) VIDEO DISPLAY IS DISPLAYING VIDEO.<br>(5B) IGNITION-OFF SIGNAL IS RECEIVED. |
| EXAMPLE 5-2 | CONDITION IS SATISFIED WHEN FOLLOWING CONDITIONS (5A) AND (5C) ARE SATISFIED.<br>(5A) VIDEO DISPLAY IS DISPLAYING VIDEO.<br>(5C) VARIOUS SIGNALS FOR ENDING HUD DISPLAY EXCEPT IGNITION-OFF SIGNAL ARE RECEIVED. |
| EXAMPLE 5-3 | CONDITION IS SATISFIED WHEN FOLLOWING CONDITIONS (5A) AND (5D) ARE SATISFIED.<br>(5A) VIDEO DISPLAY IS DISPLAYING VIDEO.<br>(5D) HUD DISPLAY-OFF SIGNAL IS RECEIVED BY USER OPERATION. |
| EXAMPLE 5-4 | CONDITION IS SATISFIED WHEN FOLLOWING CONDITIONS (5A) AND (5E) ARE SATISFIED.<br>(5A) VIDEO DISPLAY IS DISPLAYING VIDEO.<br>(5E) HUD DISPLAY CONTINUATION TIME MANAGED BY TIMER IN CONTROL UNIT REACHES PREDETERMINED TIME. |
| EXAMPLE 5-5 | CONDITION IS SATISFIED WHEN FOLLOWING CONDITIONS (5A) AND (5F) ARE SATISFIED.<br>(5A) VIDEO DISPLAY IS DISPLAYING VIDEO.<br>(5F) HUD DISPLAY CONTINUATION TIME MANAGED BY TIMER IN HUD REACHES PREDETERMINED TIME. |
| EXAMPLE 5-6 | CONDITION IS SATISFIED WHEN FOLLOWING CONDITIONS (5A) AND (5G) ARE SATISFIED.<br>(5A) VIDEO DISPLAY IS DISPLAYING VIDEO.<br>(5G) SURFACE TEMPERATURE OF DISPLAY PANEL REACHES PREDETERMINED TEMPERATURE. |
| EXAMPLE 5-7 | CONDITION IS SATISFIED WHEN FOLLOWING CONDITIONS (5A) AND (5H) ARE SATISFIED.<br>(5A) VIDEO DISPLAY IS DISPLAYING VIDEO.<br>(5H) TRANSITION OPERATION TO NON-PROJECTION MODE IS COMPLETED. |
| EXAMPLE 5-8 | CONDITION IS SATISFIED WHEN FOLLOWING CONDITIONS (5A) AND (5I) ARE SATISFIED.<br>(5A) VIDEO DISPLAY IS DISPLAYING VIDEO.<br>(5I) FAILURE OCCURS IN COMMUNICATION PATH WITH CONTROL UNIT. |

FIG. 11

| | SPECIFIC EXAMPLE OF DISPLAY END OPERATION (STEP S6) |
|---|---|
| EXAMPLE 6-1 | (S61) DISPLAY OPERATION OF VIDEO DISPLAY IS ENDED. |
| EXAMPLE 6-2 | (S61) DISPLAY OPERATION OF VIDEO DISPLAY IS ENDED.<br>(S62a) MANAGEMENT OF HUD DISPLAY CONTINUATION TIME BY TIMER IN CONTROL UNIT A IS ENDED. |
| EXAMPLE 6-3 | (S61) DISPLAY OPERATION OF VIDEO DISPLAY IS ENDED.<br>(S62b) MANAGEMENT OF HUD DISPLAY CONTINUATION TIME BY TIMER IN HUD IS ENDED. |
| EXAMPLE 6-4 | (S61) DISPLAY OPERATION OF VIDEO DISPLAY IS ENDED.<br>(S62c) MANAGEMENT OF HUD DISPLAY CONTINUATION TIME BY TIMER IN CONTROL UNIT B IS ENDED. |

FIG. 12

| | SPECIFIC EXAMPLE OF JUDGMENT OF TRANSITION CONDITION TO NON-PROJECTION MODE (STEP S7) |
|---|---|
| EXAMPLE 7-1 | CONDITION IS SATISFIED WHEN FOLLOWING CONDITIONS (7A) AND (7B) ARE SATISFIED.<br>(7A) PROJECTION MODE<br>(7B) IGNITION-OFF SIGNAL IS RECEIVED. |
| EXAMPLE 7-2 | CONDITION IS SATISFIED WHEN FOLLOWING CONDITIONS (7A) AND (7C) ARE SATISFIED.<br>(7A) PROJECTION MODE<br>(7C) VARIOUS SIGNALS FOR CAUSING TRANSITION TO NON-PROJECTION MODE EXCEPT IGNITION-OFF SIGNAL ARE RECEIVED. |
| EXAMPLE 7-3 | CONDITION IS SATISFIED WHEN FOLLOWING CONDITIONS (7A), (7D), AND (7E) ARE SATISFIED.<br>(7A) PROJECTION MODE<br>(7D) HUD DISPLAY-OFF SIGNAL IS RECEIVED BY USER OPERATION.<br>(7E) DISPLAY END OPERATION IS COMPLETED. |
| EXAMPLE 7-4 | CONDITION IS SATISFIED WHEN FOLLOWING CONDITIONS (7A), (7D), AND (7F) ARE SATISFIED.<br>(7A) PROJECTION MODE<br>(7D) HUD DISPLAY-OFF SIGNAL IS RECEIVED BY USER OPERATION.<br>(7F) PREDETERMINED TIME HAS ELAPSED AFTER DISPLAY END OPERATION IS COMPLETED. |
| EXAMPLE 7-5 | CONDITION IS SATISFIED WHEN FOLLOWING CONDITIONS (7A), (7D), AND (7G) ARE SATISFIED.<br>(7A) PROJECTION MODE<br>(7D) HUD DISPLAY-OFF SIGNAL IS RECEIVED BY USER OPERATION.<br>(7G) SURFACE TEMPERATURE OF DISPLAY PANEL REACHES PREDETERMINED TEMPERATURE BEFORE PREDETERMINED TIME HAS ELAPSED AFTER DISPLAY END OPERATION IS COMPLETED. |
| EXAMPLE 7-6 | CONDITION IS SATISFIED WHEN FOLLOWING CONDITIONS (7A) AND (7H) ARE SATISFIED.<br>(7A) PROJECTION MODE<br>(7H) DISPLAY STANDBY TIME MANAGED BY TIMER IN CONTROL UNIT REACHES PREDETERMINED TIME. |
| EXAMPLE 7-7 | CONDITION IS SATISFIED WHEN FOLLOWING CONDITIONS (7A) AND (7I) ARE SATISFIED.<br>(7A) PROJECTION MODE<br>(7I) DISPLAY STANDBY TIME MANAGED BY TIMER IN HUD REACHES PREDETERMINED TIME. |
| EXAMPLE 7-8 | CONDITION IS SATISFIED WHEN FOLLOWING CONDITIONS (7A) AND (7J) ARE SATISFIED.<br>(7A) PROJECTION MODE<br>(7J) SURFACE TEMPERATURE OF DISPLAY PANEL REACHES PREDETERMINED TEMPERATURE. |

FIG. 13

|  | SPECIFIC EXAMPLE OF TRANSITION OPERATION TO NON-PROJECTION MODE (STEP S8) |
|---|---|
| EXAMPLE 8-1 | (S81) DRIVE MECHANISM IS OPERATED AT DEFAULT SPEED (e.g. NORMAL CASE). |
| EXAMPLE 8-2 | (S82) DRIVE MECHANISM IS OPERATED AT SPEED HIGHER THAN DEFAULT SPEED (e.g. CASE WHERE SURFACE TEMPERATURE OF DISPLAY PANEL REACHES PREDETERMINED TEMPERATURE). |
| EXAMPLE 8-3 | (S83) DRIVE MECHANISM IS OPERATED AT SPEED LOWER THAN DEFAULT SPEED (e.g. CASE WHERE SURFACE TEMPERATURE OF DISPLAY PANEL DOES NOT REACH PREDETERMINED TEMPERATURE AND DRIVER IS INSIDE VEHICLE). |

HEAD UP DISPLAY APPARATUS

TECHNICAL FIELD

The present invention relates to a head up display apparatus, for example, a head up display apparatus using the augmented reality (AR).

BACKGROUND ART

Patent Document 1 discloses a discomfort-reduced display capable of reducing discomfort felt by a viewer with respect to a displayed image of a display installed in a transportation when the transportation vibrates. Specifically, the display acquires a rotational component generated in a vehicle body as inclination of the vehicle body, performs three-dimensional rotation correction of a video based on the acquired inclination of the vehicle body, determines a position and inclination for displaying the video subjected to the rotation correction so as to have a plane spatially fixed on a display unit, and projects and displays the determined video on the display unit.

RELATED ART DOCUMENTS

Patent Documents

Patent Document 1: Japanese Unexamined Patent Application Publication No. 2013-237320

SUMMARY OF THE INVENTION

Problems to Be Solved by the Invention

For example, a head up display (abbreviated as "HUD" in this specification) is installed in some cases in transportations typified by vehicles such as automobiles. The HUD displays driving information such as vehicle speed and engine speed, navigation information, and others by projecting them onto a windshield (front glass) or the like. By using the HUD, the driver can obtain the information necessary for driving without moving the line of sight to the instrument panel incorporated in the dashboard. Therefore, it is possible to contribute to safe driving.

On the other hand, the use of AR for displaying various information added to objects on the actually existing landscape has been desired in HUDs in recent years. In particular, a wide display region is required in an HUD using AR (referred to as an AR-HUD). In order to widen the display region, it is necessary to widen the opening provided on the projection optical path of the video light, that is, on the optical path from the display panel to the windshield. However, as the opening becomes wider, sunlight is more likely to enter through an optical path in a direction opposite to the projection optical path of the video light. As a result, the display panel is damaged more often.

In order to prevent the display panel from being damaged due to the incident sunlight, for example, the method in which various types of members are moved using drive mechanisms when being parked or the like, thereby adjusting the optical path of incident sunlight such that sunlight is not directed to the display panel or blocking the optical path of incident sunlight is conceivable. In such a method, the drive mechanism, for example, the drive mechanism including a motor generates operating noise during operation. The operating noise tends to increase particularly in an AR-HUD in which the size and weight of the drive mechanism may increase due to the wide display region.

In recent years, with the development and popularization of hybrid vehicles and electric vehicles, silence has been improved as compared with fuel engine vehicles, and the startup sound when the ignition is turned on has also become smaller. Therefore, for example, when the drive mechanism of the HUD is operated in response to turning on the ignition, the operating noise of the drive mechanism may cause discomfort to the user in the vehicle such as the driver.

The present invention has been made in view of the above, and one object thereof is to provide a head up display apparatus capable of suppressing the discomfort to the user caused by the operating noise.

The above and other objects and novel features of the present invention will become apparent from the description of this specification and accompanying drawings.

Means for Solving the Problems

An outline of the typical embodiment of the invention disclosed in this application will be briefly described as follows.

A typical head up display apparatus is installed in a transportation and includes an information acquisition unit, a video display, a video light projector, and a controller. The information acquisition unit acquires information related to the transportation. The video display displays a video and emits video light of the displayed video. The video light projector includes a drive mechanism and projects the video light emitted from the video display to a display region, thereby making the projected video light visually recognized as a virtual image. The controller controls the video display and the video light projector based on the information related to the transportation acquired by the information acquisition unit. Further, the controller judges whether or not a door unlock signal which is one of the information related to the transportation is received, and judges whether or not to cause the video display to start displaying the video by operating the drive mechanism in the video light projector based on a display start condition when the door unlock signal is received.

Effect of the Invention

An effect achieved by a typical embodiment of the invention disclosed in this application will be briefly described as follows. Namely, it is possible to suppress the discomfort to the user caused by the operating noise in the head up display apparatus.

BRIEF DESCRIPTIONS OF THE DRAWINGS

FIG. 3 is a block diagram showing a configuration example of a main part of a control system responsible for control in the HUD apparatus in FIG. 2.

FIG. 4 is a block diagram showing a configuration example of a part related to a control unit in FIG. 3.

FIG. 5 is a flow diagram showing a general operation example of the HUD apparatus in FIG. 1 and the like.

FIG. 6 is a diagram for describing an example of specific process contents in the judgment of transition condition to a projection mode (step S1) in FIG. 5.

FIG. 7 is a diagram for describing an example of specific process contents in the transition operation to the projection mode (step S2) in FIG. 5.

FIG. 8 is a diagram for describing an example of specific process contents in the judgment of display start condition (step S3) in FIG. 5.

FIG. 9 is a diagram for describing an example of specific process contents in the display start operation (step S4) in FIG. 5.

FIG. 10 is a diagram for describing an example of specific process contents in the judgment of display start condition (step S5) in FIG. 5.

FIG. 11 is a diagram for describing an example of specific process contents in the display end operation (step S6) in FIG. 5.

FIG. 12 is a diagram for describing an example of specific process contents in the judgment of transition condition to a non-projection mode (step S7) in FIG. 5.

FIG. 13 is a diagram for describing an example of specific process contents in the transition operation to the non-projection mode (step S8) in FIG. 5.

DETAILED DESCRIPTION OF PREFERRED EMBODIMENTS

Figure 1:
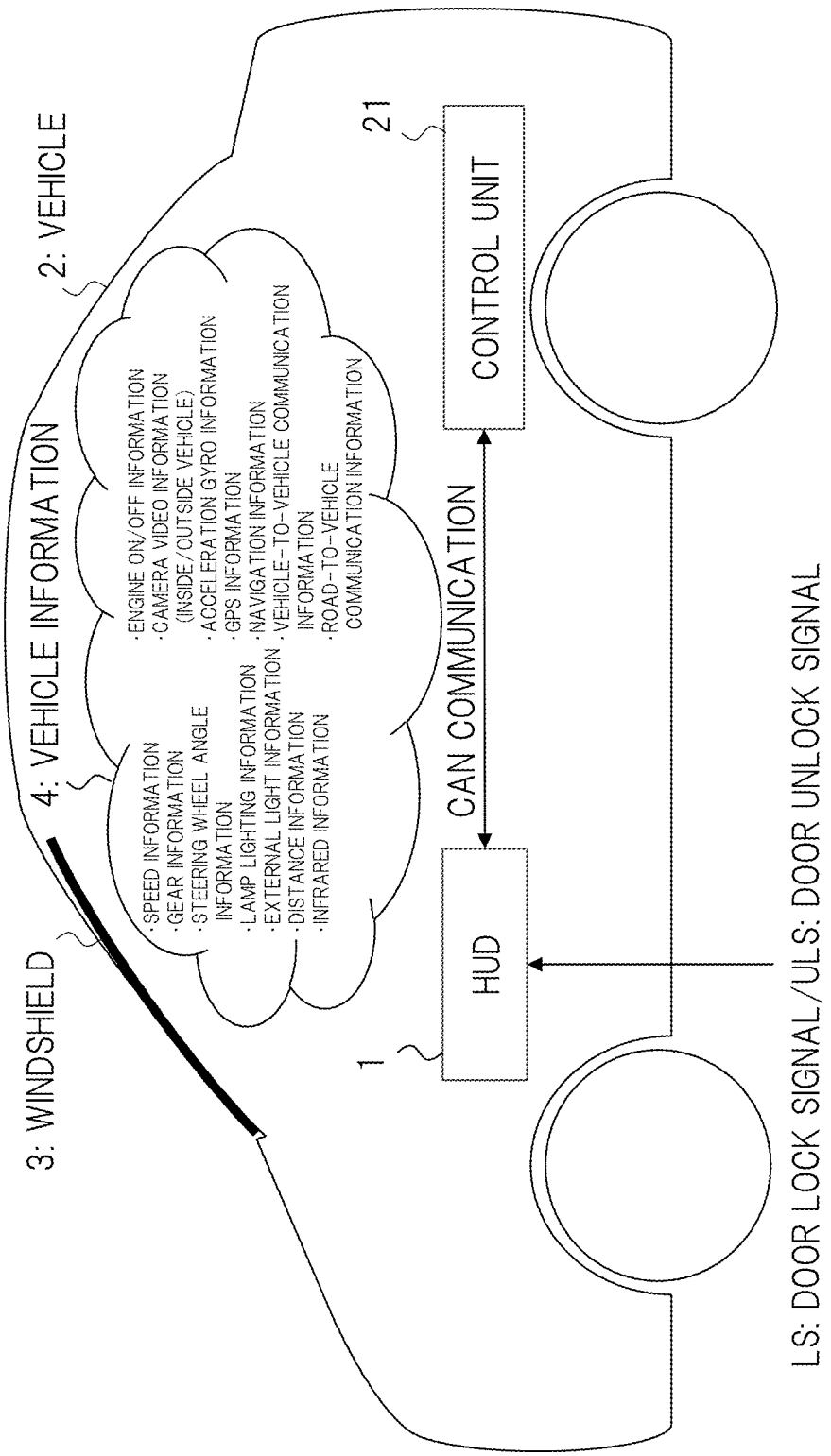
FIG. 1 is a schematic diagram showing a configuration example of a vehicle in which a head up display apparatus according to an embodiment is installed.

Hereinafter, embodiments of the present invention will be described in detail with reference to the drawings. In all the drawings for describing the embodiments, the same members are denoted by the same reference characters in principle, and the repetitive description thereof will be omitted.

Outline of HUD Apparatus

FIG. 1 is a schematic diagram showing a configuration example of a vehicle in which a head up display apparatus according to an embodiment is installed. A head up display (HUD) apparatus 1 shown in FIG. 1 is installed in a vehicle 2 as an example of transportation. The vehicle 2 is typically an automobile, but is not always limited to this and may be a train car or the like. Also, the transportation is not limited to a vehicle and may be an airplane or the like. Further, a control unit 21 referred to as an ECU (Electronic Control Unit) is installed in the vehicle 2.

The control unit 21 acquires vehicle information 4 from, for example, various sensors installed in each part of the vehicle 2 and also from a navigation device or the like. The various sensors detect, for example, various events occurring in the vehicle 2 and also detect various parameter values related to the driving situation. The HUD apparatus 1 acquires the vehicle information 4 acquired by the control unit 21 through, for example, the CAN (Controller Area Network) communication.

Furthermore, the HUD apparatus 1 receives a door lock signal LS/door unlock signal ULS of the vehicle 2. The door lock signal LS/door unlock signal ULS are generated by various methods, typically by a method in which a user such as a driver presses a button of a keyless key. Then, the generated door lock signal LS/door unlock signal ULS are transmitted to the HUD apparatus 1 via a communication path in accordance with the method.

The vehicle information 4 includes, for example, speed information and gear information of the vehicle 2, steering wheel angle information, lamp lighting information, external light information, distance information, infrared information, engine ON/OFF information, camera video information inside and outside the vehicle, acceleration gyro information, GPS (Global Positioning System) information, navigation information, vehicle-to-vehicle communication information, road-to-vehicle communication information, and others. The GPS information further includes information such as the current time. The HUD apparatus 1 projects a video onto a display region such as a windshield 3 based on the vehicle information 4. In this way, the HUD apparatus 1 causes a user such as a driver to visually recognize the video projected on the display region as a virtual image, more specifically, as a virtual image superimposed on the landscape in front of the vehicle 2.

Figure 2:
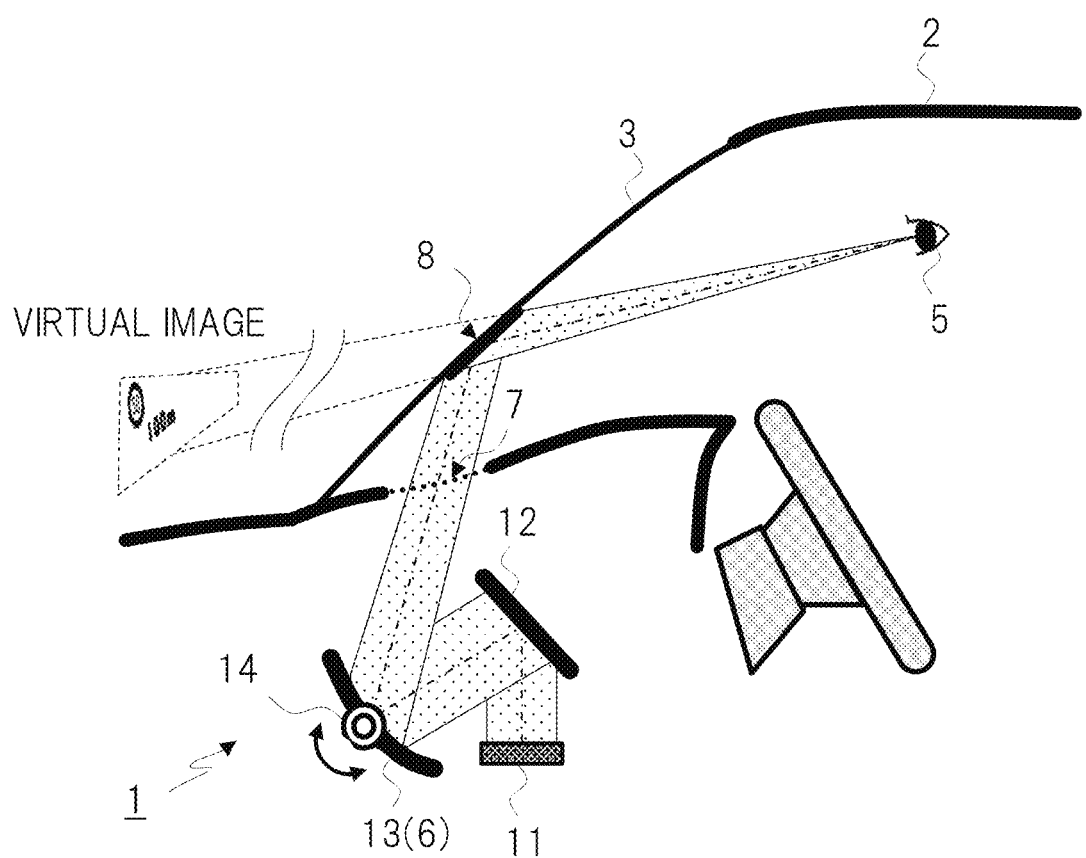
FIG. 2 is a schematic diagram showing a configuration example of a main part of the HUD apparatus in FIG. 1.

FIG. 2 is a schematic diagram showing a configuration example of a main part of the HUD apparatus in FIG. 1. The HUD apparatus 1 shown in FIG. 2 includes a video display 11, mirrors 12 and 13 that are light reflecting members, and a drive mechanism 14. The video display 11 is, for example, a projector, a liquid crystal display (LCD), or the like, and displays a video based on input video data and emits video light of the displayed video. In this specification, the mirror 12 is referred to as a first mirror. The video light emitted from the video display 11 is projected onto the mirror 13 via the first mirror 12. The mirror 13 functions as a video light projector 6. The video light projector 6 projects the video light emitted from the video display 11 onto a display region 8 of the windshield 3 through an opening 7, thereby causing a driver 5 or the like to visually recognize the projected video light as a virtual image.

Specifically, the first mirror 12 reflects the video light from the video display 11 toward the mirror 13. The mirror 13 is, for example, a concave mirror (magnifying mirror), and reflects and magnifies the video light reflected by the first mirror 12 and projects it onto the display region 8 through the opening 7. The video light projected onto the display region 8 is reflected by the display region 8 and enters the eyes of the driver 5. As a result, the driver 5 visually recognizes the video light projected on the display region 8 as a virtual image beyond the transparent windshield 3 in a form of being superimposed on the landscape (roads, buildings, people, etc.) outside the vehicle. The information represented by the virtual image includes, for example, road signs, the current speed of the own vehicle, and various information added to objects on the landscape, that is, AR information.

Here, the first mirror 12 and the mirror 13 may be, for example, a free-form surface mirror or a mirror having a shape asymmetrical with respect to an optical axis. The installation angle of the first mirror 12 is fixed. On the other hand, a drive mechanism 14 is attached to the mirror 13. In this way, the installation angle of the mirror 13 is variably adjusted via the drive mechanism 14. The drive mechanism 14 functions as a mirror driver. Specifically, for example, the drive mechanism (or mirror driver) 14 includes a motor and rotates the mirror 13 by the rotating operation of the motor.

By variably adjusting the installation angle of the mirror 13, it is possible to adjust the position of the display region 8 on the windshield 3, that is, the position of the virtual image in the vertical direction visually recognized by the driver 5. Further, for example, by increasing the area of the mirror 13 and the opening 7, the area of the display region 8 can be expanded, and more information can be projected onto the display region 8. This makes it possible to realize the AR function to display various information added to objects on the landscape.

FIG. 3 is a block diagram showing a configuration example of a main part of a control system responsible for control in the HUD apparatus in FIG. 2. As shown in FIG. 3, the HUD apparatus 1 includes a communication unit 10, a mirror driver (or drive mechanism) 14, a display driver 15, a memory 17, a temperature detector 18, a controller 20, and a signal receiver 60, which are connected to each other via a bus. The communication unit 10 acquires the vehicle information 4 from the control unit 21 through the CAN communication or the like as shown in FIG. 1. The signal receiver 60 receives the door lock signal LS/door unlock signal ULS. Also, the signal receiver 60 receives an ignition-on signal IGON/ignition-off signal IGOF.

The communication unit 10 and the signal receiver 60 function as an information acquisition unit 16 configured to acquire information related to the transportation. The communication unit 10 and the signal receiver 60 can be realized by, for example, a communication interface circuit or the like. Note that, although the door lock signal LS/door unlock signal ULS and the ignition-on signal IGON/ignition-off signal IGOF are received by the signal receiver 60 here, the communication unit 10 may receive them depending on the configuration of the vehicle 2.

For example, the mirror driver 14 rotates the mirror 13 by operating the motor, thereby adjusting the installation angle of the mirror 13. The mirror driver 14 can be realized by, for example, a motor and a motor driver circuit to drive the motor. The display driver 15 drives the video display 11 based on the video data input via the bus. The video display 11 is, for example, a liquid crystal display including a light source and an LCD panel (in other words, a display panel) configured to display a video by modulating backlight emitted from the light source in each pixel. In this case, the display driver 15 can be realized by an LCD driver circuit or the like.

The controller 20 controls the entire HUD apparatus 1. In a series of controls by the controller 20 including the operation control of the mirror driver (or drive mechanism) 14 in the video light projector 6 and the start control of the display of the video on the video display 11, two judgments including a first judgment executed in a state where the user is outside the transportation and a second judgment executed in a state where the user is inside the transportation are used. As one example thereof, the controller 20 controls the video display 11 via the display driver 15 based on the information related to the transportation acquired by the information acquisition unit 16, and further controls the mirror 13, that is, the video light projector 6 via the mirror driver 14. The memory 17 is composed by a combination of a volatile memory and a non-volatile memory. The controller 20 can be realized by, for example, executing a program stored in the memory 17 by a processor.

The temperature detector 18 detects the temperature of the video display 11, more specifically, the surface temperature of the display panel. Specifically, for example, the temperature detector 18 directly detects the surface temperature of the display panel based on the detection results of various sensors installed in the HUD apparatus 1, or indirectly detects it by calculation. For example, the latter is used when the surface temperature of the display panel cannot be detected directly due to mounting restrictions. Note that the information acquisition unit 16 and the controller 20 shown in FIG. 3 may be realized by a microcontroller as appropriate, or may be realized by FPGA (Field Programmable Gate Array), ASIC (Application Specific Integrated Circuit), or the like. In the embodiment, a configuration in which the temperature detector 18 is provided will be described as an example. However, it is not always necessary to provide the temperature detector 18.

FIG. 4 is a block diagram showing a configuration example of a part related to a control unit in FIG. 3. The control unit 21 acquires the vehicle information 4 as described in FIG. 1. The vehicle information 4 is generated by information acquisition devices such as various sensors connected to the control unit 21 as shown in FIG. 4. FIG. 4 shows an example of the information acquisition devices.

In FIG. 4, for example, a vehicle speed sensor 101 detects the speed of the vehicle 2 in FIG. 1 and generates speed information as a detection result. A shift position sensor 102 detects the current gear and generates gear information as a detection result. A steering wheel angle sensor 103 detects a current steering wheel angle and generates steering wheel angle information as a detection result. A headlight sensor 104 detects ON/OFF of the headlight and generates lamp lighting information as a detection result. An illuminance sensor 105 and a chromaticity sensor 106 detect external light and generate external light information as a detection result.

A distance sensor 107 detects the distance between the vehicle 2 and an external object and generates distance information as a detection result. An infrared sensor 108 detects the presence or absence of an object at a short distance of the vehicle 2, the distance of the object, and the like, and generates infrared information as a detection result. An engine start sensor 109 detects ON/OFF of the engine and generates ON/OFF information as a detection result. An acceleration sensor 110 and a gyro sensor 111 detect the acceleration and angular velocity of the vehicle 2, respectively, and generate acceleration gyro information representing the attitude and behavior of the vehicle 2 as a detection result. A temperature sensor 112 detects the temperature inside and outside the vehicle and generates temperature information as a detection result.

A road-to-vehicle communication wireless receiver 113 generates road-to-vehicle communication information through road-to-vehicle communication between the vehicle 2 and roads, signs, traffic lights, and the like. A vehicle-to-vehicle communication wireless receiver 114 generates vehicle-to-vehicle communication information through vehicle-to-vehicle communication between the vehicle 2 and other vehicles in the vicinity. A vehicle interior camera 115 and a vehicle exterior camera 116 capture images of the interior and exterior of the vehicle, respectively, and generate vehicle interior camera video information and vehicle exterior camera video information. The vehicle interior camera 115 is, for example, a DMS (Driver Monitoring System) camera that captures the posture, the eye position, and the eye movement of the driver 5 shown in FIG. 2. In this case, by analyzing the captured video, it is possible to grasp the fatigue state, the position of the line of sight of the driver 5, and the like.

On the other hand, for example, the vehicle exterior camera 116 captures the surrounding conditions such as the front and rear of the vehicle 2. In this case, by analyzing the captured video, it is possible to grasp the presence or absence of obstacles such as other vehicles and people existing in the surroundings, buildings and topography, road conditions such as rain, snow, ice, and undulations, road signs, and the like. In addition, the vehicle exterior camera 116 includes, for example, a drive recorder configured to record a video of the driving situation.

A GPS receiver 117 generates GPS information obtained by receiving GPS signals. For example, the GPS receiver 117 can acquire the current time. A VICS (Vehicle Information and Communication System, registered trademark) receiver 118 generates VICS information obtained by receiving VICS signals. The GPS receiver 117 and the VICS receiver 118 may be provided as a part of a navigation system. Note that the various information acquisition devices shown in FIG. 4 may be deleted or replaced with other types of devices or other types of devices may be added as appropriate.

Measure Against Sunlight

In the HUD apparatus 1 described above, for example, the case in which the sunlight enters the vehicle via the display region 8 of the windshield 3 is assumed with reference to FIG. 2. In this case, the sunlight may enter the video display 11 via the optical path in a direction opposite to the projection optical path of the video light shown in FIG. 2, that is, via the optical path sequentially passing through the mirror 13 in the video light projector 6 and the first mirror 12. As a result, the video display 11, more specifically, the display panel in the video display 11 may be damaged. In particular, in an AR-HUD in which the display region 8 is often widened, damage to the video display 11 is more likely to occur.

Therefore, as an example of the measure against sunlight, a method of rotating the mirror 13 by the drive mechanism 14 as shown in FIG. 2 can be presented. By rotating the mirror 13, it is possible to adjust the optical path of incident sunlight such that the sunlight is not directed to the video display 11. Also, the efficiency of components can be improved by using such a method. Specifically, it is possible to provide the drive mechanism 14 with a function of adjusting the display position of the virtual image and a function of the measure against sunlight.

Although not shown, as another example of the measure against sunlight, a method of installing a shutter on the optical path of incident sunlight to open and close the shutter with a drive mechanism can also presented. The shutter is installed at the position of the opening 7, the position between the mirror 13 and the first mirror 12, the position between the first mirror 12 and the video display 11, or the like. By installing such a shutter, it becomes possible to block the optical path of incident sunlight before reaching the video display 11.

By providing the drive mechanism in the video light projector 6 according to the method described as a typical example above, it is possible to realize the measure against sunlight. The video light projector 6 has a function of projecting video light from the video display 11 onto the display region 8, more specifically, a function of forming an optical path between the video display 11 and the display region 8.

Here, in this specification, a mode in which the video light projector 6 is controlled so as to project the video light onto the display region 8 is referred to as a projection mode. On the other hand, a mode in which the video light projector 6 is controlled so as not to project the video light onto the display region 8 is referred to as a non-projection mode. The non-projection mode is a mode in which sunlight is controlled so as not to enter the video display 11, namely, a protection mode. The installation angle of the mirror 13 is adjusted to the angle shown in FIG. 2 in the projection mode, and the mirror 13 is rotated from the angle shown in FIG. 2 in the non-projection mode.

For example, there is no need to display video when being parked or the like. Therefore, the video light projector 6 is controlled to the non-projection mode for the measure against sunlight. In this state, the driver 5 gets into the vehicle and executes the ignition-on operation. Normally, the HUD apparatus 1 starts operating in response to this ignition-on operation, and causes the video light projector 6 to transition from the non-projection mode to the projection mode. In this case, since the drive mechanism, for example, the motor operates in the state where the driver 5 is seated in the driver's seat, the operating noise of the motor may cause discomfort to the driver 5. The operating noise tends to increase particularly in an AR-HUD. Therefore, it is beneficial to use the method described below.

General Operation of HUD Apparatus

FIG. 5 is a flow diagram showing a general operation example of the HUD apparatus in FIG. 1 and the like. The process shown in FIG. 5 is executed by the controller 20 shown in FIG. 3. Also, as a previous step of starting the flow in FIG. 5, the case in which the vehicle 2 is parked and the controller 20 is in a stand-by state while controlling the video light projector 6 to the non-projection mode is assumed. Here, the outline of the flow of FIG. 5 will be described, and the details will be described with reference to FIG. 6 and subsequent figures. Further, in the following description, it is assumed that the drive mechanism 14 attached to the mirror 13 is used as shown in FIG. 2.

In FIG. 5, the controller 20 judges whether or not the transition condition to the projection mode is satisfied (step S1). Specifically, the controller 20 judges whether or not the door unlock signal ULS is received via the signal receiver 60 (information acquisition unit 16) as a transition condition to the projection mode. When the door unlock signal ULS is received, the controller 20 causes the video light projector 6 to transition from the non-projection mode to the projection mode (step S2) by operating the drive mechanism 14 in the video light projector 6. Specifically, the controller 20 rotates the mirror 13 via the mirror driver (or drive mechanism) 14 in FIG. 2 such that the installation angle of the mirror 13 is changed from the angle for the non-projection mode to the angle for the projection mode (that is, the angle shown in FIG. 2).

Thereafter, the controller 20 judges whether or not the display start condition is satisfied, that is, whether or not to cause the video display 11 to start displaying video (step S3). At this time, the controller 20 judges that the display start condition is satisfied when the transition to the projection mode is completed and the ignition-on signal IGON is received via the information acquisition unit 16, that is, the signal receiver 60 or the communication unit 10 as a typical example of the display start condition. When the display start condition is satisfied, the controller 20 causes the video display 11 to start displaying the video (step S4). Specifically, for example, the controller 20 turns on the light source of the video display 11 via the display driver 15.

Here, the judgment in step S1 is executed in the state where the user such as the driver 5 is outside the vehicle. On the other hand, the judgment in step S3, for example, the judgment as to whether or not the ignition-on signal IGON is received is executed in the state where the user such as the driver 5 is inside the vehicle. Then, in step S2, the drive mechanism 14 starts operating in the state where the user is outside the vehicle, and continues the operation mainly during the period when the user is outside the vehicle or when the user is moving from the outside of the vehicle to the driver's seat inside the vehicle. As a result, as compared with the case where the drive mechanism 14 starts operating in the state where the user is inside the vehicle, it is possible to suppress discomfort to the user caused by the operating noise of the drive mechanism 14.

In addition, the user such as the driver 5 does not necessarily get on the vehicle after unlocking the door and does not necessarily prepare for driving in such a case where he or she comes pick up the forgotten items in the vehicle even when he or she gets on the vehicle. Therefore, for example, the controller 20 separately judges the display start condition in step S3 after receiving the door unlock signal ULS in step S1 instead of operating the video display 11 in response to the unlocking of the door.

In step S3, the controller 20 judges whether or not the driver 5 is preparing for driving based on, for example, whether or not the ignition-on signal IGON is received. Then, when it is judged that the driver is preparing for driving, the video display 11 starts displaying the video (step S4). In other words, when it is judged that the driver is not preparing for driving, the video display 11 does not start displaying the video. By using the two-step judgment in steps S1 and S3 as described above, unnecessary power consumption associated with the operation of the video display 11 when the vehicle is not driven can be suppressed while suppressing discomfort caused by the operating noise.

Subsequently, the controller 20 judges whether or not the display end condition is satisfied, that is, whether or not to cause the video display 11 to end displaying the video (step S5). At this time, the controller 20 judges that the display end condition is satisfied when the video display 11 is displaying the video and the ignition-off signal IGOF is received via the information acquisition unit 16 as a typical example of the display end condition. When the display end condition is satisfied, the controller 20 causes the video display 11 to end displaying the video (step S6). Specifically, for example, the controller 20 turns off the light source of the video display 11 via the display driver 15.

Next, the controller 20 judges whether or not the transition condition to the non-projection mode is satisfied (step S7). Specifically, the controller 20 judges that the transition condition to the non-projection mode is satisfied when the video light projector 6 is controlled to the projection mode by step S1 and the ignition-off signal IGOF is received via the information acquisition unit 16 as one example of the transition condition to the non-projection mode.

When the transition condition to the non-projection mode is satisfied, the controller 20 causes the video light projector 6 to transition from the projection mode to the non-projection mode (step S8) by operating the drive mechanism 14. Specifically, the controller 20 rotates the mirror 13 via the mirror driver 14 and the drive mechanism 14 in FIG. 2 such that the installation angle of the mirror 13 is changed from the angle for the projection mode (that is, the angle shown in FIG. 2) to the angle for the non-projection mode.

Here, as another example of the transition condition to the non-projection mode in step S7, the controller 20 may judge that the transition condition to the non-projection mode is satisfied when the video light projector 6 is controlled to the projection mode and the temperature of the video display 11 detected by the temperature detector 18 reaches a predetermined temperature. In this way, it is possible to prevent the sunlight from entering the video display 11, more specifically, the display panel, so that the temperature rise of the display panel can be suppressed, and damage to the display panel due to the sunlight can be prevented.

Also, as another example of the transition condition to the non-projection mode in step S7, the controller 20 may judge that the transition condition to the non-projection mode is satisfied when the video light projector 6 is controlled to the projection mode and the display start condition in step S2 is not satisfied within a predetermined standby time after the transition to the projection mode is started in step S1. In this way, when the driver 5 does not prepare for driving within a predetermined time after the transition to the projection mode in response to the unlocking of the doors in step S1, that is, when the vehicle is left with the doors unlocked, it is possible to return to the non-projection mode. As a result, damage to the display panel due to the sunlight can be prevented.

Details of Judgment of Transition Condition to Projection Mode and Transition Operation to Projection Mode FIG. 6 is a diagram for describing an example of specific process contents in the judgment of transition condition to the projection mode (step S1) in FIG. 5. FIG. 6 shows examples 1-1 to 1-6 as six specific examples. In the example 1-1, the controller 20 judges whether or not the door unlock signal ULS by key insertion is received via the information acquisition unit 16 as a condition item (1A). The door unlock signal ULS at this time is generated, for example, when an operation to rotate the key inserted into the keyhole of the door is performed. The controller 20 judges that the transition condition to the projection mode is satisfied when the door unlock signal ULS by the key insertion is received.

In the examples 1-2, 1-3, and 1-4, condition items (1B), (1C), and (1D) different from the condition item (1A) in the example 1-1 are used, respectively. The condition items (1B), (1C), and (1D) are different from the condition item (1A) in the generation source of the door unlock signal ULS. The generation source of the door unlock signal ULS in the condition item (1B) is the smart key. The door unlock signal ULS at this time is generated, for example, when the driver 5 or the like with the smart key touches the doorknob.

The generation source of the door unlock signal ULS in the condition item (1C) is the keyless key. The door unlock signal ULS at this time is generated, for example, when an operation to press the unlock button of the keyless key is performed. The generation source of the door unlock signal ULS in the condition item (1D) is the mobile terminal. The door unlock signal ULS at this time is generated, for example, when the driver 5 or the like performs a predetermined operation to the application software in the mobile terminal. Note that, in the condition items (1C) and (1D), for example, the vehicle 2 receives the generated door unlock signal ULS by wireless communication, and transmits the received door unlock signal ULS to the signal receiver 60 in FIG. 3 through a predetermined communication path.

In the example 1-5, the controller 20 judges whether or not "HUD use" is set as a condition item (1E) and judges whether or not the door unlock signal ULS is received via the information acquisition unit 16 as a condition item (1F). The controller 20 judges that the transition condition to the projection mode is satisfied when "HUD use" is set and the door unlock signal ULS is received. On the other hand, in the example 1-6, the controller 20 judges whether or not "HUD non-use" is set as a condition item (1G) for preventing the transition to the projection mode. When "HUD non-use" is set, the controller 20 judges that the transition condition to the projection mode is not satisfied. In this case, the controller 20 maintains the video light projector 6 in the non-projection mode.

Depending on the HUD apparatus 1, the driver 5 or the like may be able to set HUD use/non-use by operating buttons, a menu screen, or remote control via a mobile terminal or the like. The setting information of this HUD use/non-use is stored in the memory 17 in FIG. 3, for example, at a predetermined address in a non-volatile memory. The controller 20 may refer to the setting information in the judgment of the condition item (1E) and the condition item (1G). In addition, for example, since there is no need of the transition to the projection mode in such a case where the driver 5 or the like comes pick up the forgotten items in the vehicle, it is possible to suppress the unnecessary power consumption associated with the operation of the drive mechanism 14 when the vehicle is not driven, by the control in the example 1-6.

Note that the generation source of the door unlock signal ULS in the condition item (1F) may be any of the generation sources of the examples 1-1 to 1-4 and may be any generation source other than those of the examples 1-1 to 1-4. Similarly, judgments similar to those in the examples 1-1 to 1-4 may be executed based on the door unlock signal ULS generated by other generation sources. However, the generation source of the door unlock signal ULS is desirably the generation source outside the vehicle. Namely, for example, the generation source inside the vehicle like the case where the driver 5 or the like inside the vehicle presses a door unlock button installed inside the vehicle when getting off the vehicle is desirably excluded from the generation sources of the door unlock signal ULS.

FIG. 7 is a diagram for describing an example of specific process contents in the transition operation to the projection mode (step S2) in FIG. 5. The process shown in FIG. 7 is executed when the transition condition is satisfied in the judgment of transition condition to the projection mode (step S1) shown in FIG. 6. FIG. 7 shows examples 2-1 to 2-8 as eight specific examples.

In the example 2-1, the controller 20 executes the transition operation including operation items (S21), (S22a), (S23), and (S24a). In the operation item (S21), the controller 20 causes the video light projector 6 to transition from the non-projection mode to the projection mode by operating the drive mechanism 14. In the operation item (S22a), the controller 20 starts managing the display standby time by using the timer in a control unit A. At this time, the timer in the control unit A is set to a fixed timeout value.

The control unit A may be, for example, the control unit 21 shown in FIG. 4 or may be provided separately from the control unit 21. The display standby time represents the elapsed time from the start of transition to the projection mode, and is provided for preventing damage to the display panel due to sunlight as described above. Namely, the transition to the non-projection mode is executed when the display start condition in step S3 is not satisfied within the display standby time determined by the timeout value of the timer after starting the transition to the projection mode.

In the operation item (S23), the controller 20 starts detecting the temperature of the video display 11, specifically the surface temperature of the display panel by the temperature detector 18 shown in FIG. 3. The detection of the surface temperature of the display panel is also executed for preventing damage to the display panel due to sunlight as described above. Namely, when the surface temperature of the display panel rises and reaches a predetermined temperature, the transition to the non-projection mode is executed. However, if the temperature detector 18 is not provided, the operation item (S23) may not be applied. The same applies to condition items using the temperature detector 18 described below.

In the operation item (S24a), the controller 20 does not issue the transition completion notification when the transition operation to the projection mode (step S2) is completed, that is, when the installation angle of the mirror 13 is adjusted to the state shown in FIG. 2. Here, in order to display the virtual image, it is necessary to complete at least the transition operation to the projection mode (step S2). After completing the transition operation to the projection mode (step S2), the HUD apparatus 1 can display a virtual image based on the vehicle information 4 acquired from the control unit 21.

On the other hand, the control unit 21 may want to know the timing at which the HUD apparatus 1 can start acquiring the vehicle information 4. Also, the driver 5 or the like may want to know that the HUD apparatus 1 is in the state of being able to display the virtual image. The transition completion notification is issued in these cases. However, the transition completion notification is not necessarily required, and the operation item (S24a) is applied in this case.

In the example 2-2, the controller 20 executes the transition operation including operation items (S21), (S22a), (S23), and (S24b). Namely, in the example 2-2, the operation item (S24a) is replaced with the operation item (S24b) as compared with the example 2-1. In the operation item (S24b), the controller 20 issues the transition completion notification when the transition operation to the projection mode (step S2) is completed. Specifically, the controller 20 transmits a signal representing the transition completion notification to the control unit 21, or notifies the driver 5 that the transition is completed by means of a lamp, sound, and the like.

In the example 2-3, the controller 20 executes the transition operation including operation items (S21), (S22b), (S23), and (S24a). Namely, in the example 2-3, the operation item (S22a) is replaced with the operation item (S22b) as compared with the example 2-1. In the operation item (S22b), the controller 20 starts managing the display standby time by using the timer in the control unit A as in the case of the operation item (S22a). However, at this time, the timer in the control unit A is set to a variable timeout value unlike the case of the operation item (S22a).

Specifically, the timeout value is variably controlled in accordance with the time of day, season, region, weather, and the like. For example, the time until timeout may be longer in the night than in the daytime, and may be longer in the winter than in the summer, from the viewpoint of the measure against the sunlight. In addition, since the intensity of sunlight varies depending on the region and the weather, the timeout value may be adjusted in accordance with them. Information on the time of day and season, that is, date and region can be acquired from various sources, typified by the navigation device and the like. Also, weather information can be often acquired from the navigation device.

In the example 2-4, the controller 20 executes the transition operation including operation items (S21), (S22b), (S23), and (S24b). Namely, in the example 2-4, the operation item (S24a) in which the transition completion notification is not issued is replaced with the operation item (S24b) in which the transition completion notification is issued as compared with the example 2-3.

In the examples 2-5 and 2-6, the operation item (S22a) in the examples 2-1 and 2-2 is replaced with the operation item (S22c), respectively. In the operation item (S22c), unlike the case of the operation item (S22a), the controller 20 starts managing the display standby time by using the timer in the HUD apparatus 1 instead of that in the control unit A. At this time, the timer in the HUD apparatus 1 is set to a fixed timeout value as in the case of the operation item (S22a). For example, when the HUD apparatus 1 is provided with a timer and can secure resources for the timer, the timer in the HUD apparatus 1 may be used in this way. Alternatively, the HUD apparatus 1 may manage the display standby time based on the display time of the vehicle 2 in cooperation with the vehicle 2 instead of using the timer in the HUD apparatus 1.

In the examples 2-7 and 2-8, the operation item (S22b) in the examples 2-3 and 2-4 is replaced with the operation item (S22d), respectively. In the operation item (S22d), unlike the case of the operation item (S22b), the controller 20 starts managing the display standby time by using the timer in the HUD apparatus 1 instead of that in the control unit A. At this time, the timer in the HUD apparatus 1 is set to a variable timeout value as in the case of the operation item (S22b).

Note that the controller 20 manages the display standby time by using the timer here, but it is also possible to manage the display standby time by appropriately monitoring the current time. Further, when operating the drive mechanism 14 in the operation item (S21), the controller 20 may variably control the operating speed of the drive mechanism 14. Specifically, for example, the controller 20 operates the mirror 13 at a high speed during the period from when the transition operation from the non-projection mode is started to when the installation angle of the mirror 13 reaches a predetermined intermediate angle. Since the driver 5 or the like is likely to be at a position far from the HUD apparatus 1 including the outside of the vehicle during this period, the driver 5 or the like is less likely to feel discomfort due to the operating noise.

On the other hand, the controller 20 operates the mirror 13 at a low speed during the period from when the installation angle of the mirror 13 reaches the intermediate angle to when it reaches the angle for the projection mode. Although the driver 5 or the like is likely to be at a position close to the HUD apparatus 1 including the inside of the vehicle during this period, the driver is less likely to feel discomfort due to the operating noise because of the low-speed operation of the mirror 13. However, for example, if the display start condition in step S3 is satisfied during this period, the controller 20 may operate the mirror 13 at a high speed by giving priority to starting the use of the HUD apparatus 1 by the driver 5.

Details of Judgment of Display Start Condition and Display Start Operation

FIG. 8 is a diagram for describing an example of specific process contents in the judgment of display start condition (step S3) in FIG. 5. FIG. 8 shows examples 3-1 to 3-5 as five specific examples. In the example 3-1, the controller 20 judges whether or not the transition operation to the projection mode (step S2) is completed as a condition item (3A), and judges whether or not the ignition-on signal IGON is received as a condition item (3B). The controller 20 judges that the display start condition is satisfied when the transition operation to the projection mode (step S2) is completed and the ignition-on signal IGON is received.

In the example 3-2, the controller 20 judges whether or not the transition condition to the non-projection mode is satisfied as a condition item (3C) in addition to the judgment of the condition items (3A) and (3B) described in the example 3-1. The controller 20 judges that the display start condition is satisfied when the transition operation to the projection mode (step S2) is completed, the ignition-on signal IGON is received, and the transition condition to the non-projection mode is not satisfied.

In the examples 3-1 and 3-2, as one method for judging whether or not the driver 5 is preparing for driving, the controller 20 judges whether or not the ignition-on signal IGON is received in the condition item (3B). The condition item (3A) is provided to save unnecessary power consumption because the virtual image is not displayed even if the display operation is started when the transition operation to the projection mode (step S2) is incomplete.

Here, for example, switching on/off of the light source in the video display 11 can be usually performed at a high speed. Therefore, problems such as operation delay due to the use of the condition item (3A) are unlikely to occur. However, if it takes time to perform switching on/off of the light source, the time point before the installation angle of the mirror 13 reaches the angle for the projection mode can be regarded as the time point of the completion of the transition operation to the projection mode (step S2).

The condition item (3C) is provided to prohibit the transition to the display start operation when, for example, the surface temperature of the display panel reaches a predetermined temperature. For example, in the example 3-2, when the transition operation to the projection mode (step S2) is completed and the ignition-on signal IGON is received in the condition item (3B) in the state where the transition condition to the non-projection mode is not satisfied, the flow proceeds to the display start operation in step S4. On the other hand, when the transition condition to the non-projection mode is satisfied before the ignition-on signal IGON is received in the state where the transition operation to the projection mode (step S2) is completed, the flow proceeds to the transition operation to the non-projection mode in step S8.

In the example 3-3, the controller 20 judges whether or not the driver 5 is preparing for driving as a condition item (3D) in addition to the judgment of the condition items (3A) and (3B) described in the example 3-1. The controller 20 judges that the display start condition is satisfied when the transition operation to the projection mode (step S2) is completed, the ignition-on signal IGON is received, and/or the driver 5 is preparing for driving.

The condition item (3D) is provided to judge whether or not the driver 5 is preparing for driving in addition to the judgment as to whether or not the ignition-on signal IGON is received or instead of the judgment as to whether or not the ignition-on signal IGON is received. Namely, the ignition-on operation is not necessarily performed by the driver 5. Further, the driver 5 does not always prepare for driving after performing the ignition-on operation. On the other hand, in order to avoid unnecessary power consumption and unnecessary display, for example, displaying video is desirably performed at the time when the probability of starting driving becomes sufficiently high. The condition item (3D) is an item for judging the probability of starting driving.

As a specific example of the condition item (3D), the controller 20 confirms that the driver 5 is in the state of being able to visually recognize the virtual image by means of the DMS (Driver Monitoring System) using the vehicle interior camera 115 shown in FIG. 4. Alternatively, the controller 20 confirms that the driver 5 is seated by receiving a detection signal from a load sensor installed in the driver's seat via the information acquisition unit 16. Alternatively, the controller 20 confirms that the seat belt is being worn by receiving a seat belt wearing signal via the information acquiring unit 16.

In the example 3-4, the controller 20 judges the condition item (3D) described in the example 3-3 in addition to the judgment of the condition items (3A), (3B), and (3C) described in the example 3-2. The controller 20 judges that the display start condition is satisfied when the transition operation to the projection mode (step S2) is completed, the transition condition to the non-projection mode is not satisfied, the ignition-on signal IGON is received, and/or the driver 5 is preparing for driving.

In the example 3-5, the controller 20 judges whether or not the side mirror open signal is received as a condition item (3E) in addition to the judgment of the condition items (3A) and (3B) described in the example 3-2. The controller 20 judges that the display start condition is satisfied when the transition operation to the projection mode (step S2) is completed, the ignition-on signal IGON is received, and the side mirror open signal is received.

For example, depending on the vehicle 2, the driver 5 may press a side mirror open button or the like installed inside the vehicle before starting driving. In such a case, the controller 20 can confirm that the driver 5 is preparing for driving by receiving the side mirror open signal generated by pressing the open button via the information acquisition unit 16.

Note that each condition item described in the examples 3-1 to 3-5 can be used in combination as appropriate. When priority is given to the display operation, the example 3-1 or the example 3-3 is preferably used. When it is desired to further reduce the risk of damage to the display panel, the example 3-2 or the example 3-4 including the condition item (3C) is preferably used.

FIG. 9 is a diagram for describing an example of specific process contents in the display start operation (step S4) in FIG. 5. The process shown in FIG. 9 is executed when the display start condition is satisfied in the judgment of display start condition (step S3) shown in FIG. 8. FIG. 9 shows examples 4-1 to 4-4 as four specific examples.

In the example 4-1, the controller 20 executes the display start operation including operation items (S41) and (S42). In the operation item (S41), the controller 20 causes the video display 11 to start displaying the video. Specifically, the controller 20 turns on the light source of the video display 11 via the display driver 15, and further causes the display panel to display the video based on the video data. In the operation item (S42), the controller 20 ends the management of the display standby time. Namely, since the display start condition (step S3) is satisfied, the controller 20 ends the management of the display standby time started in FIG. 7 by resetting the timer or the like.

In the example 4-2, in addition to the operation items (S41) and (S42) described in the example 4-1, the controller 20 starts managing the HUD display continuation time by the timer in the control unit A as an operation item (S43a). The HUD display continuation time is the continuous display time from when the video display 11 starts displaying the video. When a video is displayed continuously for a long time, the temperature of the display panel and the like rises due to the heat generated from the light source, which may cause damage to the display panel and the like, and the temperature may deviate from the operation guarantee temperature of the video display 11. Therefore, in order to limit the continuous display time of the video, the controller 20 starts managing the HUD display continuation time.

In the example 4-3, an operation item (S43b) is used instead of the operation item (S43a) in the example 4-2. In the operation item (S43b), unlike the operation item (S43a), the timer in the HUD apparatus 1 instead of that in the control unit A is used to manage the HUD display continuation time. Similarly, in the example 4-4, an operation item (S43c) is used instead of the operation item (S43a) in the example 4-2. In the operation item (S43c), unlike the operation item (S43a), a timer in a control unit B different from the control unit A is used to manage the HUD display continuation time.

In this way, where the timer for managing the HUD display continuation time is provided can be appropriately determined in accordance with the resources of the HUD apparatus 1 or the control units A and B. Also, for example, as shown in the example 4-2, since it is possible to end the management of the display standby time and then start the management of the HUD display continuation time instead, it is also possible to manage the two types of time by one timer. However, it is desirable in some cases to fix the timer resources for each type in advance. In this case, two timers may be secured from among those in the HUD apparatus 1 and the control units A and B.

Details of Judgment of Display End Condition and Display End Operation

FIG. 10 is a diagram for describing an example of specific process contents in the judgment of display start condition (step S5) in FIG. 5. FIG. 10 shows examples 5-1 to 5-8 as eight specific examples. In the example 5-1, the controller 20 judges whether or not the video display 11 is displaying a video as a condition item (5A), and judges whether or not the ignition-off signal IGOF is received as a condition item (5B). When the video display 11 is displaying a video and the ignition-off signal IGOF is received, the controller 20 judges that the display end condition is satisfied.

In the example 5-2, in addition to the judgment of the condition item (5A) described in the example 5-1, the controller 20 judges whether or not various signals for ending the display except the ignition-off signal IGOF are received as a condition item (5C). When the video display 11 is displaying the video and various signals for ending the display are received, the controller 20 judges that the display end condition is satisfied. Various signals for ending the display except the ignition-off signal IGOF include, for example, an HUD display-off signal by the user operation and an HUD display end signal resulting from the occurrence of a failure.

In the example 5-3, in addition to the judgment of the condition item (5A) described in the example 5-1, the controller 20 judges whether or not the HUD display-off signal by the user operation is received as a condition item (5D). The controller 20 judges that the display end condition is satisfied when the video display 11 is displaying the video and the HUD display-off signal is received. Namely, depending on the HUD apparatus 1, an operation button or the like for switching ON/OFF of the HUD display may be provided. The HUD display-off signal is generated by the operation button or the like.

In the example 5-4, in addition to the judgment of the condition item (5A) described in the example 5-1, the controller 20 judges whether or not the HUD display continuation time managed by the timer in the control unit reaches a predetermined upper limit time as a condition item (5E). The controller 20 judges that the display end condition is satisfied when the video display 11 is displaying the video and the HUD display continuation time reaches the predetermined time. The predetermined time is set in advance in accordance with, for example, the temperature and the operating time of the display panel, the external environment, and the like. Alternatively, the user may freely set the predetermined time. In this way, for example, since the temperature rise of the display panel and the like due to the heat generated from the light source can be suppressed, it is possible to reduce the risk of damage to the display panel, and it is also possible to operate the video display 11 within the operation guarantee temperature.

In the example 5-5, in addition to the judgment of the condition item (5A) described in the example 5-1, the controller 20 judges whether or not the HUD display continuation time managed by the timer in the HUD apparatus 1 reaches a predetermined time as a condition item (5F). The controller 20 judges that the display end condition is satisfied when the video display 11 is displaying the video and the HUD display continuation time reaches the predetermined time. Namely, in the examples 5-4 and 5-5, the display end condition is judged based on the HUD display continuation time whose management is started in the examples 4-2 to 4-4 in FIG. 9.

In the example 5-6, in addition to the judgment of the condition item (5A) described in the example 5-1, the controller 20 judges whether or not the temperature of the video display 11, specifically, the surface temperature of the display panel reaches a predetermined temperature as a condition item (5G). The surface temperature of the display panel is detected by the temperature detector 18 shown in FIG. 3. The controller 20 judges that the display end condition is satisfied when the video display 11 is displaying the video and the surface temperature of the display panel reaches the predetermined temperature. In this way, as in the example 5-4, it is possible to reduce the risk of damage to the display panel. Note that, when the surface temperature of the display panel reaches the predetermined temperature, it is preferable to preferentially execute the transition operation to the non-projection mode (step S8) prior to ending the display.

In the example 5-7, in addition to the judgment of the condition item (5A) described in the example 5-1, the controller 20 judges whether or not the transition operation to the non-projection mode (step S8) is completed as a condition item (5H). The controller 20 judges that the display end condition is satisfied when the video display 11 is displaying the video and the transition operation to the non-projection mode (step S8) is completed. Namely, the execution order of the transition operation to the non-projection mode (step S8) and the display end operation (step S6) can be exchanged as appropriate, and they may be executed at the same time. The condition item (5H) is a condition for executing the transition operation to the non-projection mode (step S8) prior to the display end operation (step S6).

For example, when priority is given to the measure against sunlight, as in the example 5-7, the transition operation to the non-projection mode (step S8) is executed first, or is executed at the same time with the display end operation (step S6). However, when the transition operation to the non-projection mode (step S8) and the display end operation (step S6) are performed at the same time, it may be necessary to consider the time lag or the like. Namely, if a time lag or the like occurs, for example, an event in which the display of the video as a virtual image indicating the end of the display is suddenly interrupted during its display may arise in normal time. In order to prevent such an event with an easy method, the display end operation (step S6) may be executed prior to the transition operation to the non-projection mode (step S8).

In the example 5-8, in addition to the judgment of the condition item (5A) described in the example 5-1, the controller 20 judges whether or not a failure occurs in the communication path with the control unit as a condition item (5I). Whether or not there is a failure in the communication path is judged by, for example, whether or not periodic communication referred to as a heartbeat is interrupted for a predetermined time. The controller 20 judges that the display end condition is satisfied when the video display 11 is displaying the video and a failure occurs in the communication path with the control unit. Namely, for example, when a failure occurs in the communication path between the HUD apparatus 1 and the control unit 21 in FIG. 1, it is desirable to end displaying the video as well because the vehicle information 4 cannot be acquired.

FIG. 11 is a diagram for describing an example of specific process contents in the display end operation (step S6) in FIG. 5. The process shown in FIG. 11 is executed when the display end condition is satisfied in the judgment of display end condition (step S5) shown in FIG. 10. FIG. 11 shows examples 6-1 to 6-4 as four specific examples.

In the example 6-1, the controller 20 executes a display end operation including an operation item (S61). In the operation item (S61), the controller 20 causes the video display 11 to end displaying the video. Specifically, the controller 20 turns off the light source of the video display 11 via the display driver 15, and also stops the transmission of video data.

In the example 6-2, in addition to the operation item (S61) described in the example 6-1, the controller 20 ends the management of the HUD display continuation time by the timer in the control unit A as an operation item (S62*a*). In the example 6-3, in addition to the operation item (S61) described in the example 6-1, the controller 20 ends the management of the HUD display continuation time by the timer in the HUD apparatus 1 as an operation item (S62*b*).

Similarly, in the example 6-4, in addition to the operation item (S61) described in the example 6-1, the controller 20 ends the management of the HUD display continuation time by the timer in the control unit B as an operation item (S62*c*). Namely, in the examples 6-2 to 6-4, the controller 20 ends the management of the HUD display continuation time started in the examples 4-2 to 4-4 in FIG. 9 with the end of the video display.

Details of Judgment of Transition Condition to Non-Projection Mode and Transition Operation to Non-Projection Mode FIG. 12 is a diagram for describing an example of specific process contents in the judgment of transition condition to the non-projection mode (step S7) in FIG. 5. FIG. 12 shows examples 7-1 to 7-8 as eight specific examples. In the example 7-1, the controller 20 judges whether or not the mode is the projection mode as a condition item (7A) to the non-projection mode, and judges whether or not the ignition-off signal IGOF is received as a condition item (7B). The controller 20 judges that the transition condition to the non-projection mode is satisfied when the video light projector 6 is controlled to the projection mode and the ignition-off signal IGOF is received.

In the example 7-2, in addition to the judgment of the condition item (7A) described in the example 7-1, the controller 20 judges whether or not various signals for causing the transition to the non-projection mode except the ignition-off signal IGOF are received as a condition item (7C). The controller 20 judges that the transition condition to the non-projection mode is satisfied when the video light projector 6 is controlled to the projection mode and various signals for causing the transition to the non-projection mode are received.

In the example 7-3, in addition to the judgment of the condition item (7A) described in the example 7-1, the controller 20 judges whether or not the HUD display-off signal by the user operation is received as a condition item (7D), and judges whether or not the display end operation is completed as a condition item (7E). The controller 20 judges that the transition condition to the non-projection mode is satisfied when the video light projector 6 is controlled to the projection mode, the HUD display-off signal is received, and the display end operation (step S6) is completed.

The HUD display-off signal is the signal described in the example 5-3 in FIG. 10. In the condition item (7E), it is judged whether or not the display end operation (step S6) described with reference to FIG. 11 is completed. Namely, as described in the example 5-7 in FIG. 10, the execution order of the transition operation to the non-projection mode (step S8) and the display end operation (step S6) can be selected as appropriate. The condition item (7E) is a condition for executing the display end operation (step S6) prior to the transition operation to the non-projection mode (step S8).

In the example 7-4, in addition to the judgment of the condition items (7A) and (7D) described in the example 7-3, the controller 20 judges whether or not a predetermined time has elapsed after the display end operation (step S6) is completed as a condition item (7F). The controller 20 judges that the transition condition to the non-projection mode is satisfied when the video light projector 6 is controlled to the projection mode, the HUD display-off signal is received, and a predetermined time has elapsed after the display end operation (step S6) is completed. The predetermined time is managed by, for example, the timer in the HUD apparatus 1 or the timer in the control unit.

In the example 7-5, in addition to the judgment of the condition items (7A) and (7D) described in the example 7-3, the controller 20 judges whether or not the surface temperature of the display panel reaches a predetermined temperature before a predetermined time has elapsed after the display end operation (step S6) is completed as a condition item (7G). The controller 20 judges that the transition condition to the non-projection mode is satisfied when the video light projector 6 is controlled to the projection mode, the HUD display-off signal is received, and the surface temperature of the display panel reaches the predetermined temperature before the predetermined time has elapsed after the display end operation (step S6) is completed. The surface temperature of the display panel is detected by the temperature detector 18 shown in FIG. 3.

Here, the condition item (7F) in the example 7-4 is provided for suppressing the discomfort to the driver 5 generated by the operating noise in the transition from the projection mode to the non-projection mode instead of in the transition from the non-projection mode to the projection mode. Namely, the driver 5 normally gets off the vehicle after ending the display of the video, but there is a high possibility that the driver 5 is still in the vehicle immediately after ending the display of the video. Therefore, the transition to the non-projection mode is started after waiting for a predetermined time in consideration of the time required for the driver 5 to get off the vehicle, whereby the operating noise is less likely to reach the driver 5. However, if the surface temperature of the display panel reaches a predetermined temperature within this predetermined time, it is necessary to protect the display panel. Thus, the condition item (7G) in the example 7-5 is provided.

In the example 7-6, in addition to the judgment of the condition item (7A) described in the example 7-1, the controller 20 judges whether or not the display standby time managed by the timer in the control unit reaches a predetermined time as a condition item (7H). The controller 20 judges that the transition condition to the non-projection mode is satisfied when the video light projector 6 is controlled to the projection mode and the display standby time reaches the predetermined time.

Similarly, in the example 7-7, in addition to the judgment of the condition item (7A) described in the example 7-1, the controller 20 judges whether or not the display standby time managed by the timer in the HUD apparatus 1 reaches a predetermined time as a condition item (7I). The controller 20 judges that the transition condition to the non-projection mode is satisfied when the video light projector 6 is controlled to the projection mode and the display standby time reaches the predetermined time.

Here, in the condition items (7H) and (7I) in the examples 7-6 and 7-7, the judgment is executed for the display standby time whose management is started in the transition operation to the projection mode (step S2) in FIG. 7. In this way, the transition from the projection mode to the non-projection mode is executed when the display standby time reaches the predetermined time in the state of the projection mode without executing the display start operation (step S4) in FIG. 9, that is, without ending the management of the display standby time. As a result, as described in FIG. 5 and the like as well, it is possible to prevent damage to the display panel due to sunlight.

In the example 7-8, in addition to the judgment of the condition item (7A) described in the example 7-1, the controller 20 judges whether or not the surface temperature of the display panel reaches a predetermined temperature as a condition item (7J). The controller 20 judges that the transition condition to the non-projection mode is satisfied when the video light projector 6 is controlled to the projection mode and the surface temperature of the display panel reaches the predetermined temperature. In this way, it is possible to prevent damage to the display panel due to sunlight.

FIG. 13 is a diagram for describing an example of specific process contents in the transition operation to the non-projection mode (step S8) in FIG. 5. The process shown in FIG. 13 is executed when the transition condition is satisfied in the judgment of transition condition to the non-projection mode (step S7) shown in FIG. 12. FIG. 13 shows examples 8-1 to 8-3 as three specific examples. As a premise of the examples 8-1 to 8-3, the drive mechanism 14 is configured to operate at multiple operating speeds.

In the example 8-1, the controller 20 executes a transition operation including an operation item (S81). In the operation item (S81), the controller 20 operates the drive mechanism 14 at a default speed. In the example 8-2, the controller 20 executes a transition operation including an operation item (S82). In the operation item (S82), the controller 20 operates the drive mechanism 14 at a speed higher than the default speed, for example, at the highest speed. In the example 8-3, the controller 20 executes a transition operation including an operation item (S83). In the operation item (S83), the controller 20 operates the drive mechanism 14 at a speed lower than the default speed.

Here, the operation item (S81) in the example 8-1 is an item in the normal case, for example, in the case of the transition of the video light projector 6 to the non-projection mode in response to the ignition-off signal IGOF. On the other hand, the operation item (S82) in the example 8-2 is an item in the case of, for example, the transition of the video light projector 6 to the non-projection mode when the surface temperature of the display panel reaches a predetermined temperature. Further, the operation item (S83) in the example 8-3 is an item in the case of, for example, the transition of the video light projector 6 to the non-projection mode when the surface temperature of the display panel does not reach a predetermined temperature and the driver 5 is inside the vehicle.

By using the operation item (S82), for example, it is possible to quickly protect the display panel from sunlight. By using the operation item (S83), it is possible to reduce the operating noise of the drive mechanism 14 and suppress the discomfort to the driver 5 caused by the operating noise. Note that the operation item (S83) can be used in place of the operation item (S81). Namely, the ignition-off signal IGOF, the HUD display-off signal, and the like described above are normally generated in the state where the driver 5 is inside the vehicle. Also, the controller 20 may determine the operating speed of the drive mechanism 14 based on the condition items when the transition condition is satisfied in the judgment of transition condition to the non-projection mode (step S7) shown in FIG. 12.

In the foregoing, specific examples have been described regarding the condition items used for each condition judgment and the operation items of the corresponding operations with reference to FIG. 6 to FIG. 13. However, for example, the combinations of condition items described in FIG. 6, FIG. 8, FIG. 10, and FIG. 12 are not limited to those shown therein, and can be changed as appropriate. Further, the and/or conditions of the condition items can also be changed as appropriate. In addition, the combinations and order of the operation items described in FIG. 7, FIG. 9, FIG. 11, and FIG. 13 can also be changed as appropriate.

General Operation of HUD Apparatus
(Modification)

Figure 14:
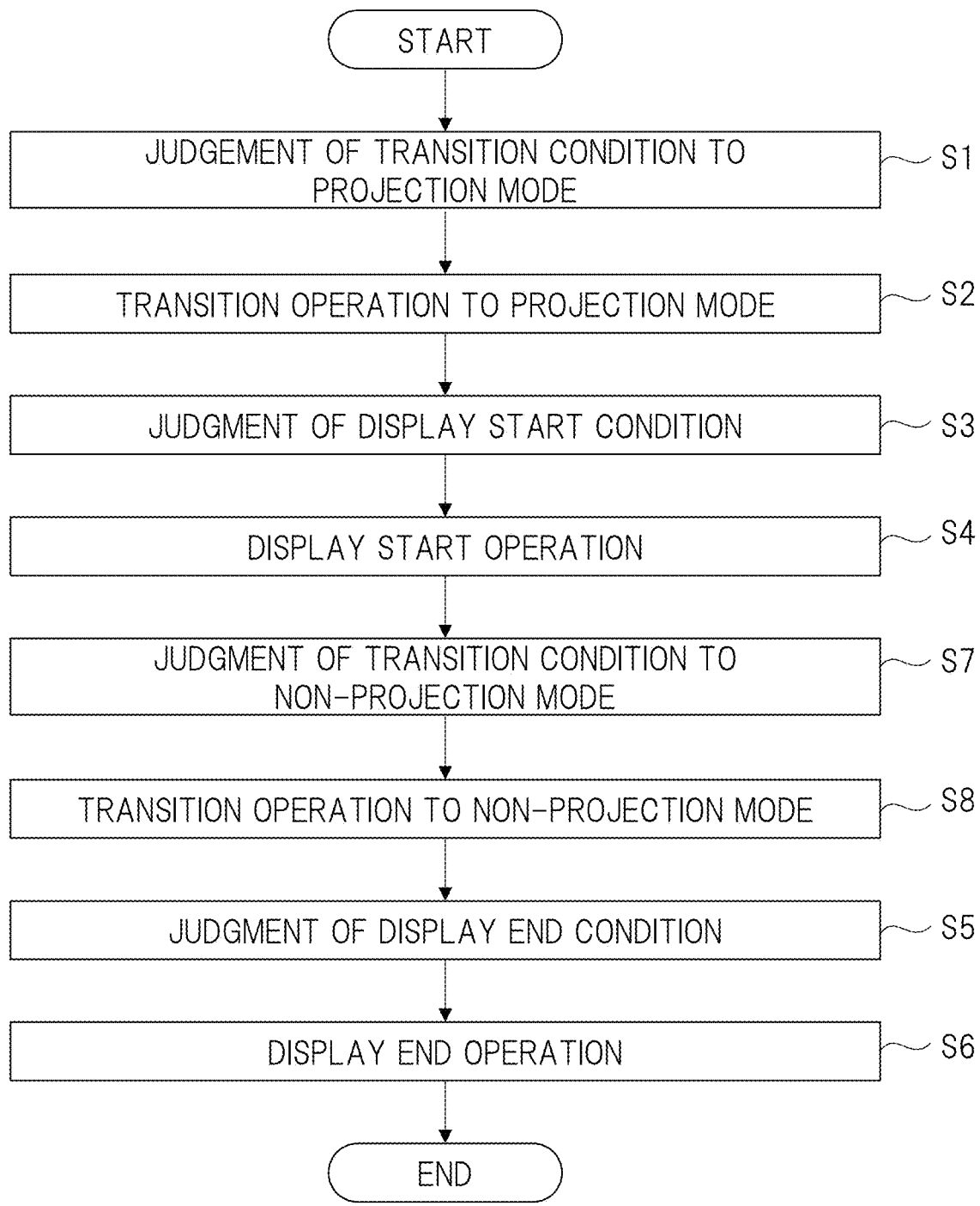
FIG. 14 is a flow diagram showing a general operation example of an HUD apparatus as a modification of FIG. 5.
Figure 15:
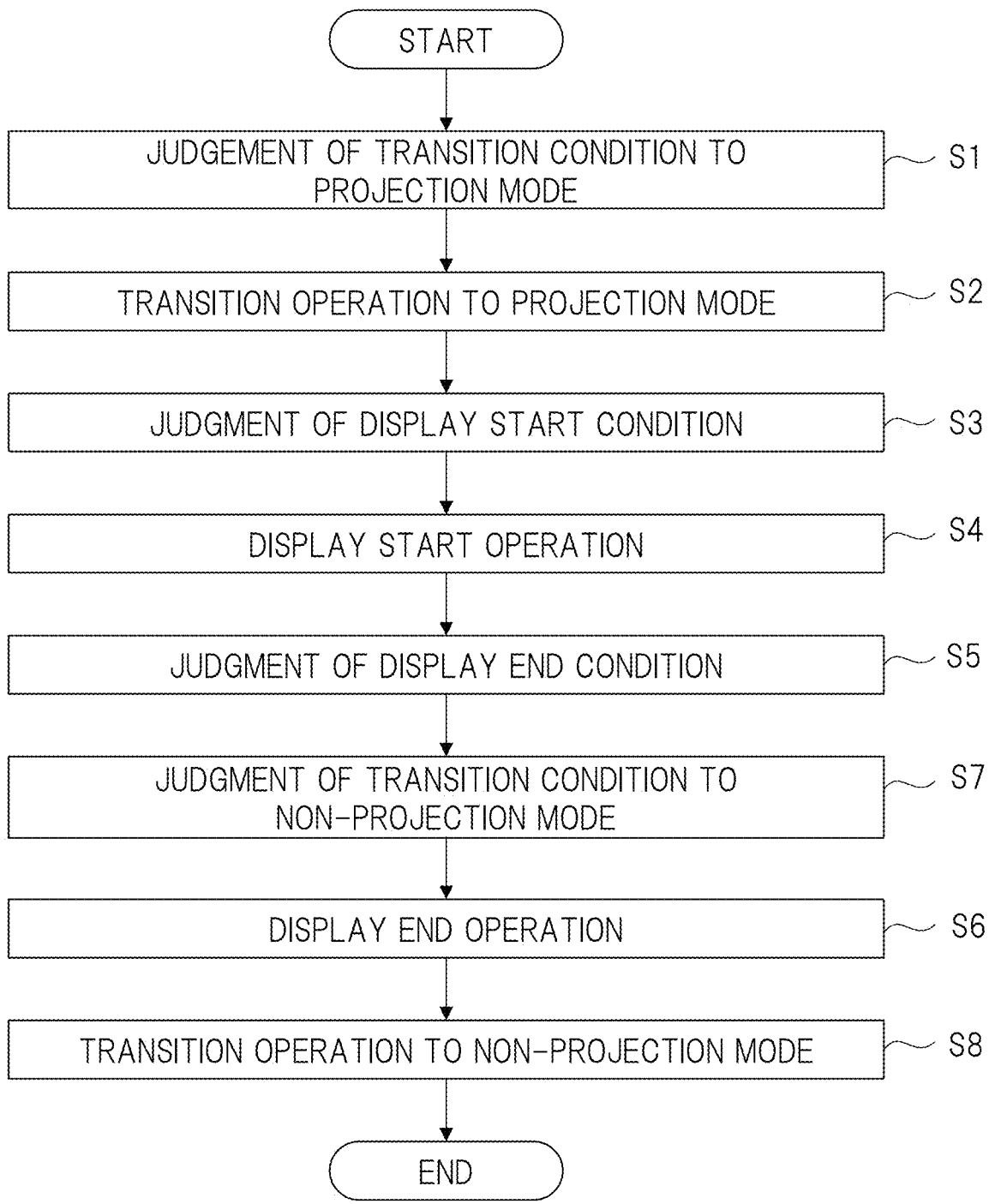
FIG. 15 is a flow diagram showing a general operation example of an HUD apparatus as another modification of FIG. 5.

Each of FIG. 14 and FIG. 15 is a flow diagram to be a modification of FIG. 5 and is a flow diagram showing a general operation example of an HUD apparatus. The flow shown in FIG. 14 is different from the flow shown in FIG. 5 in that the controller 20 executes the judgment of display end condition (step S5) and the display end operation (step S6) after executing the judgment of transition condition to the non-projection mode (step S7) and the transition operation to the non-projection mode (step S8) in FIG. 14.

On the other hand, the flow shown in FIG. 15 is different from the flow shown in FIG. 5 in that the controller 20 executes the display end operation (step S6) and the transition operation to the non-projection mode (step S8) after executing the judgment of display end condition (step S5) and the judgment of transition condition to the non-projection mode (step S7) in FIG. 15.

As described in the example 5-7 and the like in FIG. 10, the execution order of the display end operation (step S6) and the transition operation to the non-projection mode (step S8) can be exchanged as appropriate, and they may be executed at the same time. Further, it is sufficient if the controller 20 executes the judgment of display end condition (step S5) before the display end operation (step S6) and executes the judgment of transition condition to the non-projection mode (step S7) before the transition operation to the non-projection mode (step S8).

In the flow shown in FIG. 14, the execution order of the display end operation (step S6) and the transition operation to the non-projection mode (step S8) is exchanged with respect to the flow shown in FIG. 5. In the flow shown in FIG. 15, the display end operation (step S6) and the transition operation to the non-projection mode (step S8) can be executed almost at the same time with respect to the flow shown in FIG. 5.

Further, for example, in the flow shown in FIG. 15, the controller 20 can dynamically change the execution order of the display end operation (step S6) and the transition operation to the non-projection mode (step S8) in accordance with the results in the judgment of display end condition (step S5) and the judgment of transition condition to the non-projection mode (step S7). As an example, the controller 20 may first execute the display end operation (step S6) when the ignition-off signal IGOF is received, and the controller 20 may first execute the transition operation to the non-projection mode (step S8) when the temperature detector 18 detects an abnormality.

Main Effects of Embodiment

As described above, by using the HUD apparatus according to the embodiment, typically, it is possible to prevent damage caused by sunlight and suppress discomfort to the user caused by operating noise. In particular, such effects can be achieved by operating the drive mechanism 14 in the video light projector 6 and the video display 11 based on different conditions by using the two-step judgment including the judgment of transition condition to the projection mode (step S1) and the judgment of display start condition (step S3). Further, damage to the display panel and the like can be more reliably prevented by controlling the drive mechanism 14 and the video display 11 based on the display standby time, the HUD display continuation time, the temperature of the display panel detected by the temperature detector 18, and the like.

In the foregoing, the invention made by the inventor of this application has been specifically described based the embodiments, but the present invention is not limited to the embodiments described above and can be modified in various ways within the range not departing from the gist thereof. For example, the embodiments above have been described in detail in order to make the present invention easily understood, and the present invention is not necessarily limited to the embodiments having all of the described configurations. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

For example, by using the technique according to the embodiment, as described above, it is possible to suppress the discomfort to the user caused by operating noise while preventing damage caused by sunlight. In addition, it is possible to provide the information display apparatus (head up display apparatus) capable of visually recognizing the video of information necessary for driving such as the alert information when oncoming vehicles or pedestrians are detected in addition to the navigation information such as the destination and speed projected on the windshield and contributing to the assistance of the safety driving by reducing the movement of the viewpoint of the driver. In this way, it is possible to prevent traffic accidents. Further, it is possible to contribute to "Goal 3: Ensure healthy lives and promote well-being for all at all ages" in the Sustainable Development Goals (SDGs) advocated by the United Nations.

Further, in the embodiment, the drive mechanism 14 is provided for the measure against sunlight. However, the drive mechanism 14 may be provided for the purposes other than the measure against sunlight. As an example, the case where a shutter member for storing the HUD apparatus 1 in a period when the HUD apparatus 1 is not operated is provided in the opening 7 or the like in FIG. 2 is conceivable. Since the same problem may arise in such a case, it is beneficial to apply the method of the embodiment.

REFERENCE SIGNS LIST 1 head up display (HUD) apparatus
2 vehicle
4 vehicle information
5 driver (user)
6 video light projector
8 display region
11 video display
13 mirror
14 drive mechanism (mirror driver)
16 information acquisition unit
18 temperature detector
20 controller
IGOF ignition-off signal
IGON ignition-on signal
ULS door unlock signal

The invention claimed is:

1. A head up display apparatus installed in a transportation, the head up display apparatus comprising:
   an information acquisition unit configured to acquire information related to the transportation;
   a video display configured to display a video and emit video light of the displayed video;
   a video light projector including a drive mechanism and configured to project the video light emitted from the video display to a display region, thereby making the projected video light visually recognized as a virtual image; and
   a controller configured to control the video display and the video light projector based on the information related to the transportation acquired by the information acquisition unit,
   wherein the controller judges whether or not a door unlock signal which is one of the information related to the transportation is received, and judges whether or not to cause the video display to start displaying the video by operating the drive mechanism in the video light projector based on a display start condition when the door unlock signal is received, and
   wherein the controller executes the judgment as to whether or not the door unlock signal is received in a state where a user is outside the transportation, and executes the judgment based on the display start condition in a state where the user is inside the transportation.

2. The head up display apparatus according to claim 1, wherein the video light projector is controlled to a non-projection mode in which it does not project the video light to the display region or a projection mode in which it projects the video light to the display region, and
   wherein the controller causes the video light projector to transition from the non-projection mode to the projection mode by operating the drive mechanism when the door unlock signal is received.

3. The head up display apparatus according to claim 1, wherein the video light projector includes:
   a mirror configured to reflect the video light toward the display region; and
   the drive mechanism configured to adjust an angle of the mirror, and
   wherein the controller controls an installation angle of the mirror via the drive mechanism, thereby causing the video light projector to transition between the non-projection mode in which it does not project the video light and the projection mode in which it projects the video light.

4. The head up display apparatus according to claim 2, wherein the controller causes the video display to start displaying the video when the transition to the projection mode is completed and an ignition-on signal which is one of the information related to the transportation is received as the display start condition.

5. The head up display apparatus according to claim 2, wherein the controller causes the video display to start displaying the video when the transition to the projection mode is completed and seating of a driver in a driver's seat of the transportation is detected or a side mirror open signal of the transportation is received as the display start condition.

6. The head up display apparatus according to claim 2, wherein the controller causes the video display to end displaying the video when the video display is displaying the video and an ignition-off signal which is one of the information related to the transportation is received.

7. The head up display apparatus according to claim 2, wherein the controller causes the video display to end displaying the video when the video display is displaying the video and a predetermined display continuation time has elapsed after the video display starts displaying the video.

8. The head up display apparatus according to claim 2, wherein the controller causes the video light projector to transition from the projection mode to the non-projection mode by operating the drive mechanism when the video light projector is controlled to the projection mode and a predetermined time has elapsed after causing the video display to end displaying the video.

9. The head up display apparatus according to claim 2, wherein the controller causes the video light projector to transition from the projection mode to the non-projection mode by operating the drive mechanism when the video light projector is controlled to the projection mode and an ignition-off signal which is one of the information related to the transportation is received.

10. The head up display apparatus according to claim 2, further comprising:
    a temperature detector configured to detect a temperature of the video display,
    wherein the controller causes the video light projector to transition from the projection mode to the non-projection mode by operating the drive mechanism when the video light projector is controlled to the projection mode and the temperature detected by the temperature detector reaches a predetermined temperature.

11. The head up display apparatus according to claim 10,
wherein the drive mechanism is configured so as to be able to set multiple operating speeds, and
wherein the controller operates the drive mechanism at a high speed when causing the video light projector to transition from the projection mode to the non-projection mode due to the predetermined temperature.

12. A head up display apparatus installed in a transportation, the head up display apparatus comprising:
an information acquisition unit configured to acquire information related to the transportation;
a video display configured to display a video and emit video light of the displayed video;
a video light projector including a drive mechanism and configured to project the video light emitted from the video display to a display region, thereby making the projected video light visually recognized as a virtual image; and
a controller configured to control the video display and the video light projector based on the information related to the transportation acquired by the information acquisition unit,
wherein the video light projector is controlled to a non-projection mode in which it does not project the video light to the display region or a projection mode in which it projects the video light to the display region,
wherein the controller judges whether or not a door unlock signal which is one of the information related to the transportation is received, and judges whether or not to cause the video display to start displaying the video by operating the drive mechanism in the video light projector based on a display start condition when the door unlock signal is received, and
wherein the controller causes the video light projector to transition to the non-projection mode by operating the drive mechanism when the display start condition is not satisfied within a predetermined time after the video light projector starts transitioning from the non-projection mode to the projection mode.

13. A head up display apparatus installed in a transportation, the head up display apparatus comprising:
an information acquisition unit configured to acquire information related to the transportation;
a video display configured to display a video and emit video light of the displayed video;
a video light projector including a drive mechanism and configured to project the video light emitted from the video display to a display region, thereby making the projected video light visually recognized as a virtual image; and
a controller configured to control the video display and the video light projector based on the information related to the transportation acquired by the information acquisition unit,
wherein, in a series of controls including an operation control of the drive mechanism in the video light projector and a start control of the display of the video in the video display executed by the controller, two judgments including a first judgment executed in a state where a user is outside the transportation and a second judgment executed in a state where the user is inside the transportation are used, and
wherein a judgment as to whether or not a door unlock signal is received is executed by the first judgement in a state where the user is outside the transportation, and a judgment based on a display start condition is executed by the second judgement in a state where the user is inside the transportation.

* * * * *